(12) United States Patent
Chen et al.

(10) Patent No.: US 6,584,142 B1
(45) Date of Patent: Jun. 24, 2003

(54) MATCHED FILTER

(75) Inventors: Ben Chen, Chiba (JP); Makoto Uchishima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/460,899

(22) Filed: Dec. 14, 1999

(30) Foreign Application Priority Data

Mar. 16, 1999 (JP) ............................................ 11-070838

(51) Int. Cl.[7] .............................. H04B 1/69; H04B 1/707
(52) U.S. Cl. ..................... 375/143; 375/142; 375/147; 375/149; 375/152
(58) Field of Search ................................. 375/142, 143, 375/147, 152, 343, 144, 148, 149, 150, 153

(56) References Cited

U.S. PATENT DOCUMENTS

| | | | | |
|---|---|---|---|---|
| 5,790,591 A | * | 8/1998 | Gold et al. | 375/206 |
| 5,903,595 A | * | 5/1999 | Suzuki | 375/207 |
| 6,181,733 B1 | * | 1/2001 | Shinde | 375/152 |
| 6,330,292 B1 | * | 12/2001 | Dent et al. | 375/343 |
| 6,377,613 B1 | * | 4/2002 | Kawabe et al. | 375/142 |
| 6,512,785 B1 | * | 1/2003 | Zhou et al. | 375/143 |
| 2002/0034215 A1 | * | 3/2002 | Inoue et al. | 375/147 |

FOREIGN PATENT DOCUMENTS

JP    9-46173    2/1997

OTHER PUBLICATIONS

Ben Chen et al; A Low Power Consumption Digital Matched Filter Design for Widebanc DS–CDMA; published in the 11th Workshop on Circuits and System in Karuizawa, Japan Arp. 20–21, 1998.

* cited by examiner

Primary Examiner—Stephen Chin
Assistant Examiner—Sam Ahn
(74) Attorney, Agent, or Firm—Katten Muchin Zavis Rosenman

(57) ABSTRACT

In a matched filter, a spread data path unit holds inputted spread data, a multiplier unit multiplies an output of the spread data path unit by a spreading replica code, and an adder unit adds results of the multiplication and outputs an added result. The spread data path unit comprises a first selector being able to selectively output the spread data, a plurality of sub spread data path units each having a plurality of latch circuits temporarily holding the spread data from the first selector, and a second selector being able to selectively output outputs from the sub spread data path units, whereby a circuit scale of the spread data path unit is decreased.

12 Claims, 19 Drawing Sheets

MATCHED FILTER

BACKGROUND OF THE INVENTION

(1) Field of the Invention

The present invention relates to a matched filter suitable for use in a radio receiver adopting direct sequence code division multiple access.

(2) Description of Related Art

In direct sequence code division multiple access (DS-CDMA [Direct Sequence Code Division Multiple Access]), the transmitter primarily modulates a data code in, for example, QPSK (Quadrature Phase Shift Keying), spreads a bandwidth thereof using a spreading code, and transmits the data code. On the other hand, the receiver cross-correlates using the same spreading code as in the transmitter to detect a peak of the correlation value, performs acquisition and tracking, and demodulates by correlation detection.

FIG. 11($a$) is a block diagram of a transmitting unit of a radio terminal in DS-CDMA using QPSK. In the transmitting unit 30 of the radio terminal in DS-CDMA shown in FIG. 11($a$), a data code is QPSK-modulated in a primary modulating unit 30$a$, a bandwidth of the signal is spread with an PN code (Pseudo Noise Code) in a spreading modulating unit 30$b$, an output of the spreading modulating unit 30$b$ is up-converted in a frequency converting unit 30$c$, a power thereof is amplified in an RF amplifying unit 30$d$, and a radio signal is sent out to a radio propagation path from an antenna 30$e$.

FIG. 12 is a diagram showing a relationship among a data code, a spreading code and a transmit code when the data is spread using QPSK in the primary modulation. Data codes $D_i$ and $D_q$ are complex-multiplied by spreading codes $C_i$ and $C_q$ in multipliers 36$a$, 36$b$, 36$c$ and 36$d$, and obtained results are added in adders 37$a$ and 37$b$ and outputted as transmit codes $S_i$ and $S_q$. The complex-multiplication signifies an operation $[(D_i+j \cdot D_q) \cdot (C_i+j \cdot C_q)]$ with the date codes $D_i$ and $D_q$ and the spreading codes $C_I$ and $C_q$, where j represents an imaginary unit ($j^2=-1$).

Next, a receiving system will be described. FIG. 11($b$) shows a block diagram of a receiving unit of the radio terminal in DS-CDMA using QPSK. In the receiving unit 31 of the radio terminal in DS-CDMA, a weak radio signal whose bandwidth has been spread is received by an antenna 31$a$, the radio signal is amplified with a low noise in an RF amplifying unit 31$b$, an output of the RF amplifying unit 31$b$ is down-converted in a frequency converting unit 31$c$. Further, the signal down-converted in the frequency converting unit 31$c$ and a spreading replica code generated inside the receiving unit 31 are band-cross-correlated in a despread demodulating unit 31$d$, a narrow-band signal is thereby taken out, and an output of the despread demodulating unit 31$d$ is QPSK-demodulated in a primary demodulating unit 31$e$.

FIG. 13 is a diagram showing a detailed structure of the receiving unit 31 of the radio terminal in DS-CDMA using QPSK. As shown in FIG. 13, a flow of the signal in the frequency converting unit 31$c$, the despread demodulating unit 31$d$ and the primary demodulating unit 31$e$ is as follows. Namely, an I channel signal is mixed with an output of a local oscillator 38$b$ in a frequency converting unit 38$a$, whereas a Q channel signal is mixed with an output of a 90° phase shifter 38$c$ in a frequency converting unit 38$d$. Outputs of the frequency converting units 38$a$ and 38$d$ are converted from analog to digital in A/D (analog/digital) converters 39$a$ and 39$b$. These digital signals are branched and inputted to despread demodulating unit 40. In four matched filters in the despread demodulating unit 40, the signals are band-cross-correlated, an output of a matched filter 40$a$ and an output of a matched filter 40$d$ are added, in an adder unit 41$a$, whereby I channel data $S_i$ is outputted. In a similar manner, a signal obtained by inverting an output of a matched filter 40$b$ and an output of a matched filter 40$c$ are added in an adder unit 41$b$, Q channel data $S_q$ is thereby outputted. These outputs are QPSK-demodulated in a post-demodulation processing unit 42.

Next, band-cross-correlation in the despread demodulating unit 40 will be described. The despread demodulating unit 40 generates spreading replica codes $C_i$ and $C_q$ in the same sequence as on the transmitter's side to perform despreading, which comprises the matched filters 40$a$, 40$b$, 40$c$ and 40$d$. When the two spread codes are cross-correlated, each of the I channel component and the Q channel component is despread two times, four times in total. In the matched filters 40$a$, 40$b$, 40$c$ and 40$d$, M(nt) in the following formula (1) is computed.

$$M(nt) = \Sigma^T_{k=1} R(k) \cdot P(nt) \cdot Z^{-k} \qquad (1)$$

Where t is a chip duration, T is the number of taps, R is a spreading replica code, k and n are integers, P(nt) is a received spread code, and Z is a complex number in Z transform. One chip duration t represents a time for which the spread code is switched, designed to be a time of speed several tens to several hundreds times one bit duration. One chip duration t is a reciprocal of a chip rate. The number of taps T represents a length of a spread code. A length of the spread code is, for example, 256 bits, but there can be used a different spread code of, for example, 128 bits or the like. The received spread code P(nt) and the spreading replica code R(k) of 256 bits are EXORed, a result of this is shifted at the chip rate, added and outputted. Accordingly, an output signal $D_i$ of the A/D converter 39$a$ and an output signal $C_i$ of a spreading replica code generator 44$a$ are cross-correlated in the matched filter 40$a$. In the similar manner, an output signal $D_i$ of the A/D converter 39$a$ and an output signal $C_q$ of the spreading replica code generator 44$a$ are cross-correlated in the matched filter 40$b$, an output signal $D_q$ of the A/D converter 39$b$ and an output signal $C_i$ of the spreading replica code generator 44$a$ are cross-correlated in the matched filter 40$c$, and an output signal $D_q$ of the A/D converter 39$b$ and an output signal $C_q$ of the spreading replica code generator 44$a$ are cross-correlated in the matched filter 40$d$. A reason why the number of the matched filter is four is to-prevent degradation of an S/N (Signal/Noise) ratio of a despread signal.

Such a matched filter is a key device necessary to despread a received spread code, there is hence required a low power thereof. FIG. 14 is a diagram showing a block structure of the matched filter. The matched filter 40$a$ (40$b$, 40$c$ or 40$d$) shown in FIG. 14 cross-correlates a digital signal outputted from the A/D converter 39$a$ or 39$b$ shown in FIG. 13 with a spreading replica code generated inside the receiving unit 31, thereby despreading the signal. The matched filter 40$a$ (40$b$, 40$c$ or 40$d$) comprises a spread data path unit 43, a spreading replica code generator 44$a$, a register for replica code 44$b$, a multiplier unit 45 and an adder unit 46. The spread data path unit 43 is a shift register that captures a received spread code input at each clock and shifts the code one stage by one stage, which comprises T flip-flops (FF) 43-1, 43-2, 43-3, . . . 43-(T−2), 43-(T−1) and 43-T. Hereinafter, the flip-flop will be abbreviated as FF occasionally. The spreading replica code generator 44$a$ generates a spreading replica code identical to one used in the transmitter. The register for replica code 44b is a register for computing the spreading replica code generated by the spreading replica code generator 44a. The multiplier unit 45 multiplies each of outputs of the flip-flops 43-1, 43-2, 43-3, ..., 43-(T−2), 43-(T−1) and 43-T with each output of the register for replica code 44b. The adder unit 46 adds outputs from the multiplier unit 45 and outputs an added result. Each of the multiplier unit 45 and the adder unit 46 has the number of taps T, to which a clock at the chip rate is inputted. In FIG. 14, the number of spread data path bits represents the number of bits equal to a modulation multi-value in the primary modulation. In this case, the number of spread data path bits is 6. The received spread code signifies that one symbol is received with 6 bits. Therefore, a total number N of the necessary flip-flops is given by N=D×T, where D is the number of spread data path bits and T is the number of taps of the flip-flops.

This circuit is an example where the number of times of over-sampling is 1, so that sampling is performed once during one chip duration. The flip-flops are therefore in T stages equal in number to a length of the spread code. When the over-sampling is performed plural times within one chip duration, the operation is performed plural times equal to the number of times of over-sampling within one chip duration. In the case of four-times over-sampling, for example, the sampling is performed four times within one chip duration on a spread code of 256 bits. The number of stages of the flip-flops M is given by M=T×O, where T is the number of taps T and O is the number of times of over-sampling. Accordingly, a total number N of necessary flip-flops is given by N=D×M, where D is the number of spread data path bits and M is the number of stages of the flop-flops.

FIG. 15 is a functional block diagram of the matched filter. It is only necessary to hold a received spread code (spread data input) consisting of plural bits shown in FIG. 15 for one cycle in the sp read data path unit 43, it being unnecessary to shift the spread code. One cycle of the spread code is a time for which the received spread code is held, corresponding to a life time of P(nt). This cycle U is expressed as U=[(one chip duration)×(the number of taps T)]. The operation of the formula (1) is performed in the multiplier unit 45 and the adder unit 46, and can be performed in any portion without limitations on the order or positions of operators since the operation does not rely on results of operations performed before and after. Further, since the contents of the operation on any received spread code is quite the same, it is seen that the operation is "symmetrical". With the matched filter, initial acquisition can be very quickly, and a process up to despreading can be completed once. The matched filter has futures ① through ④ below.

① operating at a frequency equal to or greater than a chip rate (in the case of over-sampling);

② since the spreading data path unit is generally configured with a shift register, all the flip-flops always operate;

③ in order to certainly hand data to be shifted, a flip-flop of a master/slave type in two stages is used as the flip-flops configuring the shift register;

FIG. 16(a) is a diagram showing a structure of the shift register in which flip-flops of a master/slave type are used. FIG. 16(b) is a diagram showing an example of a structure of the flip-flop of a master/slave type in two stages. A clock terminal of the master FF and a clock terminal of the slave FF are given signals inverted to each other. FIG. 16(c) is a diagram for illustrating an operation of the flip-flop of a master/slave type in two stages. An input signal is stored at a posiedge clock, and the stored input signal is outputted at a negaedge clock shown in FIG. 16(c).

④ in the case of QPSK, four matched filters are basically required in order to separate into I channel and Q channel.

However, these futures conversely cause the following problems. Namely, these futures causes an increase of power consumption (①) since the device operates at a high frequency, an increase of the number of flip-flops to be operated (②), and an increase of circuit scale of the spread data path unit (③ and ④) further, from ② to ④, an increase of scale of the circuit because of the long shift register and adder. Moreover, since a switching activity in the spread data path unit is very high, the power consumption is increased.

Some of inventors of this invention have proposed a structure of a ring register in substance in the following publication.

Ben CHEN and Hideto FURUKAWA, "A Low Power Consumption Digital Matched Filter Design for Wideband DS-CDMA", The Institute of Electronics, Information and Communication Engineers, 1998, "Technical Group of Circuits and Systems (CAS)" Work Shop (Apr. 20 and 21, 1998).

FIG. 17 is a schematic block diagram of a matched filter 50 disclosed in the above publication. A received spread signal is stored in one of FFs in a spread data path unit 51b designated by a spread data input control unit 51a. Incidentally, the number of the FFs shown in FIG. 17 is equal to [(the number of taps)×(the number of times of over-sampling)]. A position designated by the spread data input control unit 51a is cyclically changed at each clock. The stored code is held in the register for only one cycle, shifting being not at all performed. In a multiplier unit 51c having multipliers having the same number [(the number of taps)×(the number of times of over-sampling)], a spreading replica code generated in its own station is shifted at each clock to perform EXOR operation, and a result of the operation is outputted from an adder unit 51d, whereby computation of despreading is completed.

FIG. 18. is a diagram conceptually showing circuit structures of the spread data input control unit 51a and the spread data path unit 51b, illustrating that circuit structures are conceptually ring. "Ring" means that a position at which data is held in the spread data path unit 51b is cyclically changed. In other words, "ring" means a cyclical circuit structure in which a received spread code is stored in a flip-flop at the tail of the shift register circuit, the next received signal is then stored in a flip-flop in the front of the shift register circuit. In this sense, the register circuit for storing (plural bits) is in a ring structure. Note that this does not mean a physical ring circuit arrangement.

FIG. 19 is a diagram showing a structure of the spread data input control unit 51a. A shift register circuit 52 shown in FIG. 19 is a circuit called a round robin ring, configured with [(the number of taps)×(the number of times of over-sampling)] flip-flops connected to one another. An output of a flip-flop at the tail of the shift register circuit 52 is inputted to a flip-flop at the head of the shift register circuit 52, so that the shift register circuit 52 is in the ring structure as well as the above circuit.

In the round robin ring, only one flip-flop indicates the state "1", the remaining flip-flops are all kept in the state "0", and the flip-flop in the state "1" is successively shifted at each sampling clock. Outputs of these flip-flops are connected to flip-flops of the spread data path register circuit 51b in the next stage, neither more or less. Only a flip-flop in the spread data path register circuit 51b connected to the flip-flop in the round robin ring whose state is "1" captures a received spread code. As this, a position in which a received spread code is stored is cyclically changed. In the spread data input control circuit 51a, a flip-flop in operation is always one, so that the switching activity is largely decreased, the power consumption is thus effectively decreased.

However, each of the spread data path register circuit 51b and the round robin ring (shift register circuit 52) is configured with flip-flops in 1024 stages simply connected to one another. For this, the circuit is excessively concentrated from a viewpoint of circuit structure or layout, so that the layout becomes impossible.

SUMMARY OF THE INVENTION

In the light of the above problems, an object of the present invention is to provide a matched filter, in which the spread data path unit is divided into sub spread data path units equal in number to the number of times of over-sampling so as to decrease a circuit scale of the spread data path unit, each of the sub spread data path units is configured with latch circuit so as to further decrease the circuit scale, each of the sub spread data path units uses an independent clock so as to decrease frequencies of circuit operation, a code load register always recognizes the leading position of a spread code so that the spread code can be instantaneously switched, and a dynamic mask is served to cope with a multi-tap spread code, whereby the switching activity and the circuit scale of the whole circuit of the matched filter is effectively decreased.

The present invention therefore provides a matched filter comprising a spread data path unit comprising a first selector being able to selectively output spread data, a plurality of sub spread data path units each comprising a plurality of latch circuits temporarily holding the spread data from the first selector, and a second selector being able to selectively output outputs from the sub spread data path units, a spread data path input control unit comprising a selector control unit for performing a selection control on the first selector and the second selector according to an input of the spread data, and a data holding control unit for performing a data holding control on the sub spread data path units, a spreading code setting unit being able to set a spreading code, and an arithmetic unit for multiplying an output from the spread data path unit by the spreading code from the spreading code setting unit, adding results of the multiplication and outputting a result of the addition.

Accordingly, with the above structure, the wiring becomes simpler, and excessive concentration of the circuits can be avoided. Since the huge spread data path unit is divided, not a high-speed clock but a low-speed clock can be used so that the power consumption can be decreased. Further, the switching activity and the circuit scale of the whole circuit of the matched filter can be effectively decreased.

The above spread data path unit may comprise sub spread data path units equal in number to the number of times of over-sampling, and each of the sub spread data path units may be configured with latch circuits equal in number to taps.

It is thereby possible to take out the contents at one clock, which is advantageous with respect to speed. It is also possible to reduce a scale of the whole circuit since a shift register causing an increase of the circuit scale is not used.

The data holding control unit may comprise a round robin ring in which finite-state holding units equal in number to the taps are arranged in a ring, and states of the finite-state holding units equal in number to the taps are successively changed at a chip rate such that a state of only one finite-state holding unit among the finite-state holding units equal in number to the taps differs from a state of the other finite-state holding units, so that data holding to the latch circuits configuring each of the sub spread data path units is updated in a predetermined order.

Accordingly, with the above structure, the layout becomes easy and wasteful switching can be avoided, since [(the number of times of over-sampling)×(the number of taps)] shift register circuit that is huge is not used.

The above selector control unit may comprise a phase counter for generating plural kinds of phase state signals within one chip duration and cyclically outputting the phase state signals, and the first selector may cyclically give inputted spread data to the sub spread data path units in synchronism with the different kinds of phase state signals from the phase counter, whereas the second selector may select one output among outputs of the sub spread data path units and output the selected output in synchronism with a corresponding one of the different kinds of phase state signals from the phase counter. The different kinds of phase state signals may correspond to phase states equal in number to the number of times of each over-sampling.

Accordingly, the layout of the circuit becomes easier, and wasteful switching can be avoided, since a huge shift register circuit is not used.

The above spreading code setting unit may set plural kinds of spreading codes in order to cope with plural kinds of spread code lengths. The spreading code setting unit may comprises code register for holding the spreading code for operation and a code load register being inputted thereto a control signal from the outside to load the next spreading code while the arithmetic unit operates, and the code load register may update contents at a predetermined position of the code register at a predetermined timing. The code load register may be inputted thereto an enable/disable signal controlled from the outside to capture the next spreading code when the enable/disable signal is enable, while not capturing when the enable/disable signal is disable, and be controlled by an algorithm updating contents at the leading position of the code register in synchronism with the code register.

Accordingly, with the above structure, it is possible to cope with an instantaneous switching of the spread code even if the spread code or the number of taps in use is changed.

The above spreading code setting unit may comprise a code register for holding the spreading code for operation and a code load register being inputted thereto a control signal from the outside to load the next spreading code while the arithmetic unit operates, a multi-tap control unit may be disposed on the multiplied output's side of the arithmetic unit in order to cope with plural kinds of spreading codes, the multi-tap control unit may comprise a mask ring comprising finite-state holding units not less in number than applied taps, and a logical product of an output of each of the finite-state holding units of the mask ring and a multiplied output of the arithmetic unit is outputted to an adder unit of the arithmetic unit.

Accordingly, with the above structure, it is possible to cope with different kinds of spread code lengths with one matched filter, so that it is possible to track the data even if an optional specification is added to the system, and a degree of freedom in designing is increased.

In the mask ring, continuing finite state holding units equal in number to the taps among the finite-state holding units may hold the same state so that a state thereof differs from a state of the other finite-state holding units, and the leading position in the mask ring may be shifted in synchronism with the code register. The multi-tap control unit may be inputted thereto a spread code identify signal that can be controlled from the outside.

Accordingly, with the above structure, the leading position in the mask rings is shifted in synchronism with the code register so that data tracking is possible.

The present invention also provides a matched filter comprising a spread data path unit comprising a plurality of sub spread data path units in each of which a plurality of latch circuits are arranged in order that spread data is inputted thereto, a spread data path input control unit for performing a data holding control to the latch circuits, in a predetermined order according to an input of the spread data, a spreading code setting unit being able to set a spreading code, and an arithmetic unit for multiplying an output from the spread data path unit by the spreading code from the spreading code setting unit, adding results of the multiplication and outputting a result of the addition.

Accordingly, with the above structure, the wiring becomes simple and excessive concentration of the circuit can be avoided, as well. Since the hug spread data path unit is divided, it becomes possible to use a low-speed clock in lieu of a high-speed clock, which leads to a decrease of frequencies of the circuit operation. Further, the switching activity and the circuit scale of the whole circuit of the matched filter are effectively decreased.

DESCRIPTION OF THE PREFERRED EMBODIMENTS

Hereinafter, description will be made of embodiments of this invention with reference to the drawings.

(A). Description of an Embodiment of This Invention

Figure 1:
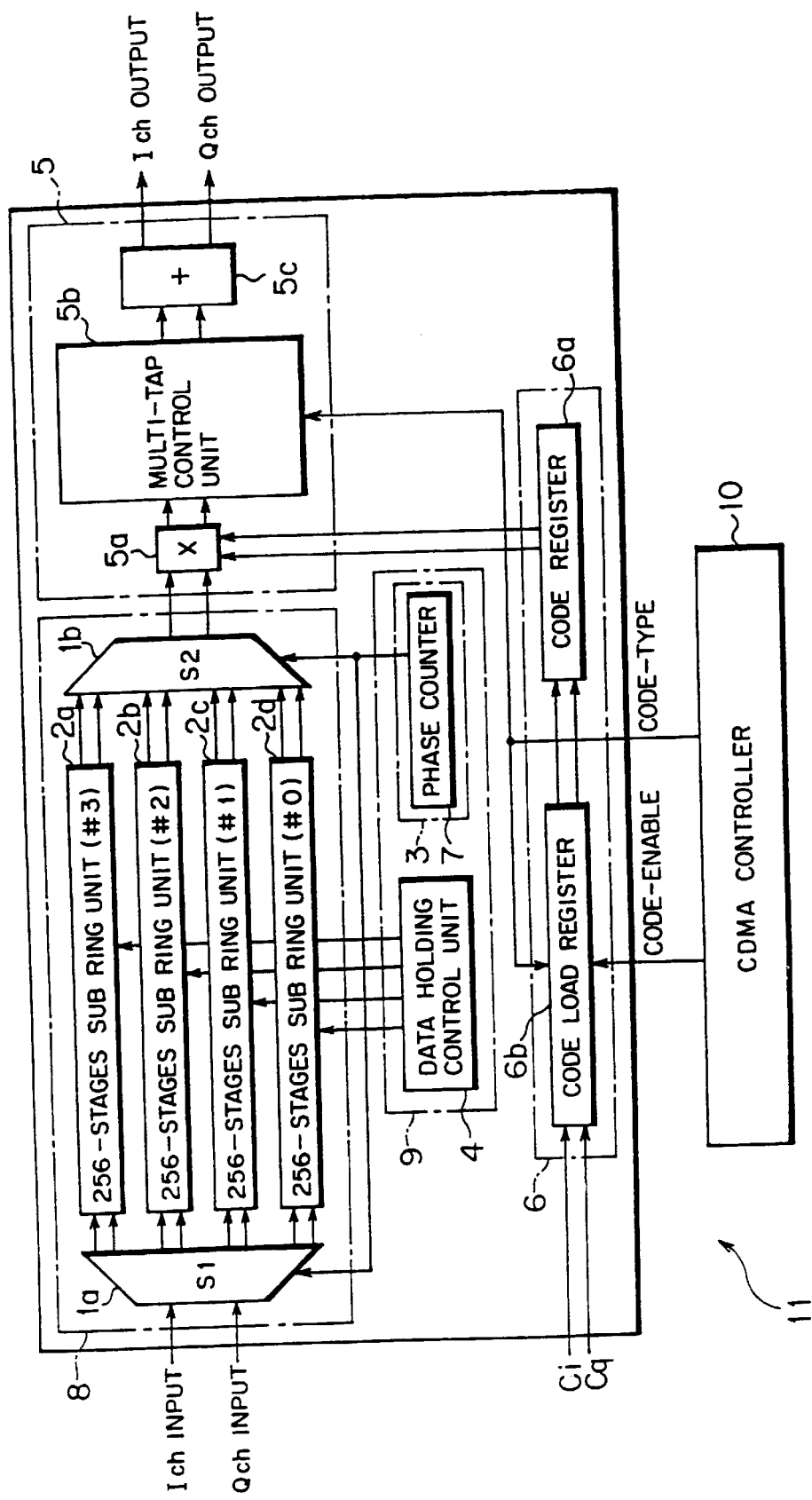
FIG. 1 is a block diagram of a matched filter to which this invention is applied.

FIG. 1 is a block diagram of a matched filter to which this invention is applied. The matched filter 11 shown in FIG. 1 comprises a CDMA controller 10, a spread data path unit 8, a spread data path input control unit 9, a spreading code setting unit 6 and an arithmetic unit 5.

For the sake of description hereinafter, concrete numeral values used in the matched filter 11 to which this invention is applied are as follows. The number of taps is T=256, corresponding to a length of the used spread code. The number of times of over-sampling O is the number of times of over-sampling performed within one chip duration, set to O=4. The number of spread data path bits D represents a width of data of bits equal in number to a modulation multivalue in the primary modulation, set to D=6. The data is transmitted and received with 6 bits as representation of two's complement. In addition, the chip rate is 4 MHz, and one chip duration is a reciprocal thereof.

The spread data path unit 8 shown in FIG. 8 holds a received spread code (hereinafter referred as spread data input or merely as spread data, occasionally) for computing cross-correlation, which comprises a first selector 1a, sub spread data path units 2a, 2b, 2c and 2d, and a second selector 1b. In FIG. 1, the first selector 1a is denoted as "S1", the sub spread data path units 2a, 2b, 2c and 2d are denoted as "256-stages sub ring units (0# to #3)", and the second selector 1b is denoted as "S2". The received spread code is divided into four blocks and stored.

The first selector 1a can selectively output the spread data. Each of the sub spread data path units 2a, 2b, 2c and 2d comprises a plurality of latch circuits temporarily holding the spread data from the first selector 1a. The spread data path unit 8 comprises the sub-spread data path units 2a, 2b, 2c and 2d. The four sub spread data path units 2a, 2b, 2c and 2*d* are equal in number to 4 that is the number of times of over-sampling. Each of the sub spread data path units 2*a*, 2*b*, 2*c* and 2*d* comprises 256 latch circuits each temporarily holding the spread data. The second selector 1*b* can selectively output outputs from the sub spread data path units 2*a* 2*b*, 2*c* and 2*d*.

Figure 2:
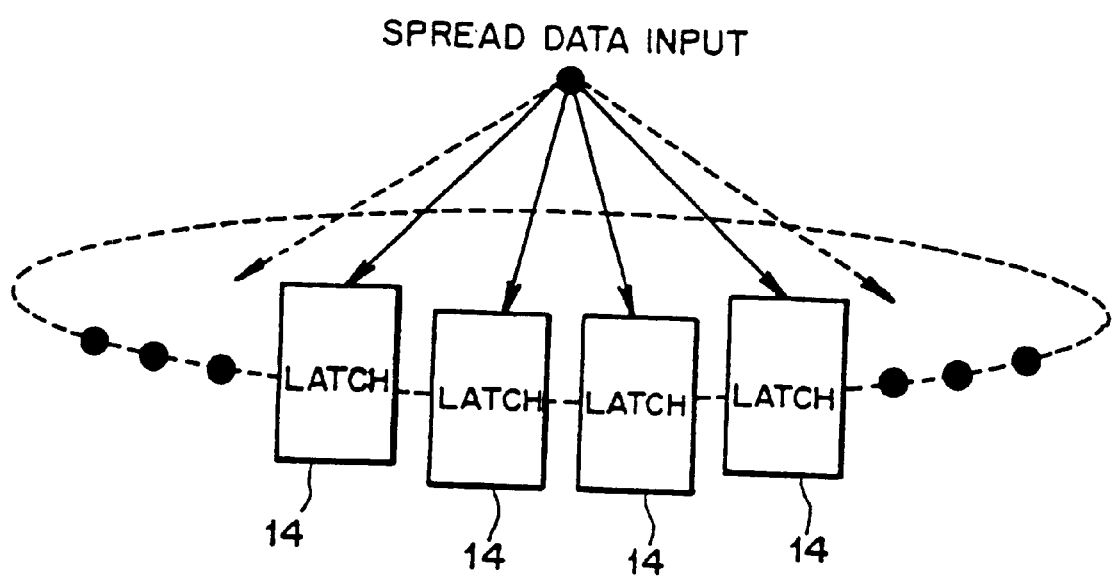
FIG. 2 is a diagram showing a structure of a sub spread data path unit according to an embodiment of this invention.

FIG. 2 is a diagram showing a structure of the sub spread data path unit according to the embodiment of this invention. As shown in FIG. 2, the received spread code is held in latch circuits 14. A cycle at which one of these latch circuits 14 is updated is a duration equal to [(the number of taps T)×(chip duration t)], corresponding to a time required for the received data to appear its full length.

In order to take out the received spread code from the latch circuits 14, only one clock is required, which is advantageous with respect to the speed. Further, since a shift register causing an increase of the circuit scale is not used but the latch circuits 14 in a smaller scale are used, it is advantageously possible to decrease the whole circuit. Whereby, it becomes unnecessary to use a flip-flop of a master/slave type in two stages, the circuit scale becomes ½ or ⅓ of a flip-flop having an equivalent function. In consequence, there can be expected a scale-down of the circuit scale to ½ or ⅓.

Again back to FIG. 1, the spread data path input control unit 9 shown in FIG. 1 controls positions at which the received spread code is written in order to write the same in the latch circuits 14 in the above sub spread data path units 2*a*, 2*b*, 2*c* and 2*d*, which comprises a selector control unit 3 and a data holding control unit 4. The selector control unit 3 controls selection in the first selector 1*a* and the second selector 1*b* according to the received spread code, which comprises a phase counter 7. The data holding control unit 4 controls holding of data in the sub spread data path units 2*a*, 2*b*, 2*c* and 2*d*.

The phase counter 7 generates four different kinds of phase state signals within one chip duration, and cyclically outputs one phase state signal of the four different kinds of state signals. The first selector 1*a* cyclically gives the inputted (received) spread code to the sub spread data path units 2*a*, 2*b*, 2*c* and 2*d* in synchronism with four different kinds of phase state signals from the phase counter 7, whereas the second selector 1*b* selects one output among outputs of the sub spread data path units 2*a*, 2*b*, 2*c* and 2*d*, and outputs the same in synchronism with a corresponding one among the four different kinds of phase state signals from the phase counter 7. Namely, these four different kinds of state signals correspond to four kinds of phase states equal to the number of times of each over-sampling, four different kinds of discrimination are thereby possible on one kind of received spread code. To accomplish the function of generating the phase state signals, a state generator of a one-hot type is used, in which four kinds of state signals are expressed with a combination of high and low of two flip-flops. By using the state generator of a one-hot type, it is possible to provide a tolerant circuit of a so-called "pulse-like" noise.

Figure 3:
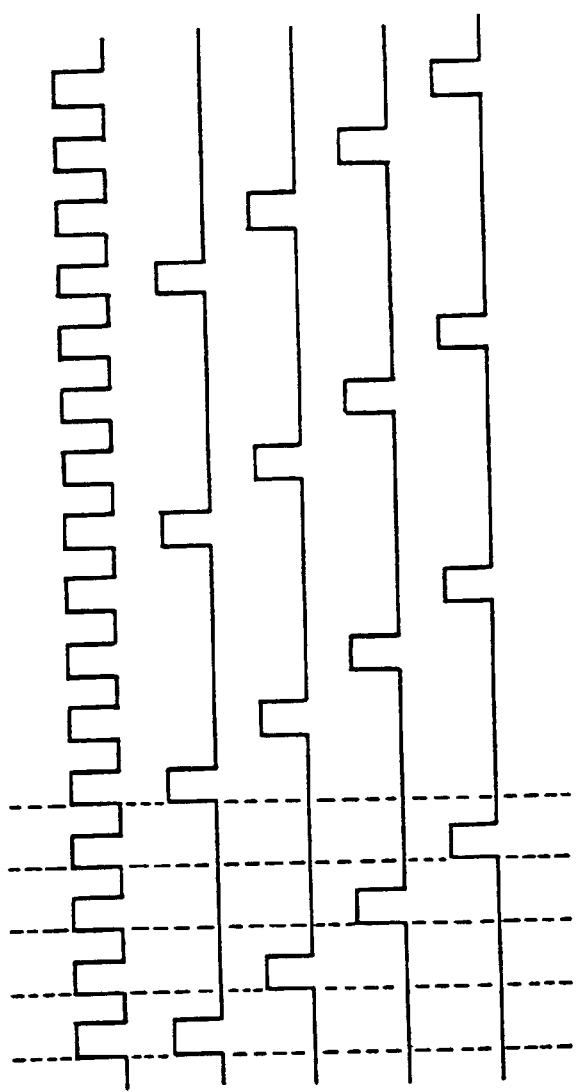
FIGS. 3(a) through 3(e) are diagrams showing a time chart representing a relationship among a master clock and clock groups of the sub spread data path units according to the embodiment of this invention.

FIGS. 3(*a*) through 3(*e*) are diagrams showing a time chart representing a relationship among a master clock (Master Clock) and clock groups (#0, #1, #2 and #3) of the sub spread data path units 2*a*, 2*b*, 2*c* and 2*d*. For the master clock shown in FIG. 3(*a*), a speed 16 MHz, for example, is used. For the clocks of the sub spread data path units 2*a*, 2*b*, 2*c* and 2*d* shown in FIGS. 3(*b*) through 3(*e*), 4 MHz, for example, is used. This value corresponds to the chip rate. As shown in FIGS. 3(*a*) through 3(*e*), the sub spread data path unit 2*a* belongs to the clock group #0, the sub spread data path unit 2*b* belongs to the clock group #1, the sub spread data path unit 2*c* belongs to the clock group 2# and the sub spread data path unit 2*d* belongs to the clock group #3, and phases of these clocks are shifted a ¼ cycle from one another.

Each of the sub spread data path units 2*a*, 2*b*, 2*c* and 2*d* uses an independent clock, whereby a frequency of the operation is decreased from 16 MHz to 4 MHz. Under the controls of the first selector 1*a* and the second selector 1*b*, inputs of the received spread codes are cyclically given to the four sub spread data path units 2*a*, 2*b*, 2*c* and 2*d*, so that only the sub spread code path unit that should be updated operates. This realizes a decrease of the switching activity.

Further, each of the sub spread data path units 2*a*, 2*b*, 2*c* and 2*d* has 256 latch circuits 14. For this it is unnecessary to prepare a huge shift register circuit consisting of, for example, 256×4=1024 latch circuits 14, so that the layout design of the circuit becomes easy.

Figure 4:
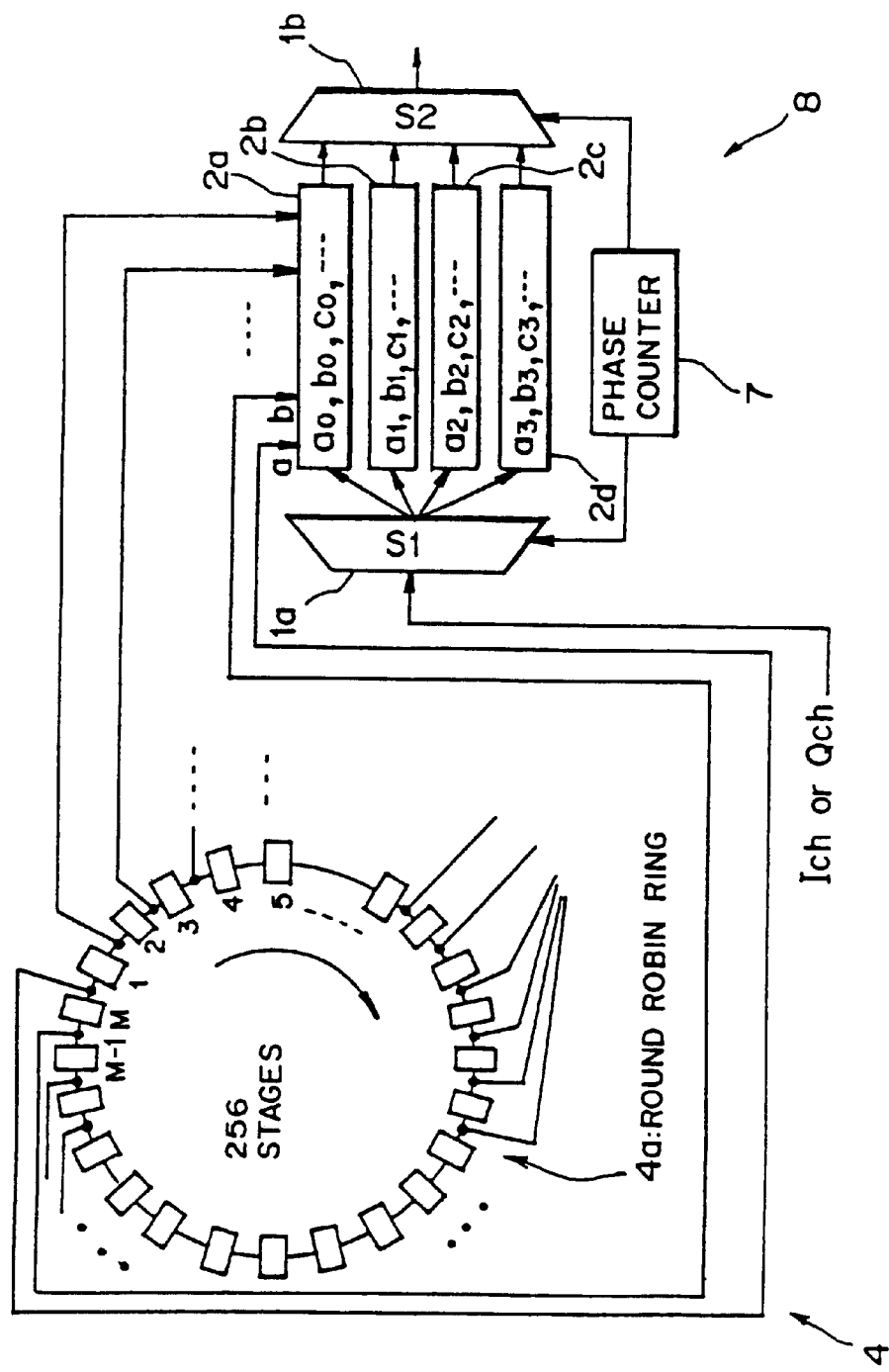
FIG. 4 is a diagram for illustrating a process of storing the received spread data in the four sub spread data path units.

Next, which latch circuit 14 in the sub spread data path units 2*a*, 2*b*, 2*c* and 2*d* the received spread code is written in will be described. FIG. 4 is a diagram for illustrating a process of storing the received spread code in the above four sub spread data path units 2*a*, 2*b*, 2*c* and 2*d*. The data holding control unit 4 shown in FIG. 4 controls data holding in the above sub spread data path units 2*a*, 2*b*, 2*c* and 2*d*, which comprises a round robin ring 4*a*.

The round robin ring 4*a* is configured with 256 finite-state holding units (flip-flops) equal in number to the taps circularly arranged. The data holding control unit 4 successively changes states of the 256 finite-state holding units at the chip rate such that a state of one of the 256 finite-state holding units differs from the state of the other finite-state holding units, whereby data writing to the latch circuits 14 configuring each of the sub spread data path units 2*a*, 2*b*, 2*c* and 2*d* is updated in a predetermined order.

The round robin ring 4*a* operates at the chip rate (4 MHz), and functions such as to successively indicate a position at which a newly received spread code is stored. Incidentally, a term "ring" does not signifies an arrangement in terms of circuit, but a structure in which an output of a register at the tail of the shift register is inputted to a register in the head so that data goes around. Meanwhile, only I channel is depicted in FIG. 4, but Q channel is almost the same, descriptions of which are thus omitted.

A process of storing a received spread code in the sub spread data path units 2*a*, 2*b*, 2*c* and 2*d* shown in FIG. 4 is as follows. Namely, an I channel spread code is inputted to the first selector 1*a*, and this one spread code is made four spread code's and stored in positions indicated by the round robin ring 4*a*. For instance, from a received spread code "a", spread codes "$a_0$", "$a_1$", "$a_2$" and "$a_3$" are obtained in four-times over-sampling, and these spread codes are distributed by the first selector 1*a* operating on the basis of the four kinds of phase state signals of the phase counter 7, and inputted to the latch circuits 14 in the sub spread data path units 2*a*, 2*b*, 2*c* and 2*d*.

The round robin ring 4*a* does not use a huge shift register circuit in [(the number of taps)×(the number of times of over-sampling)] stages as well, so that a scale of the circuit is decreased. Further, with respect to the circuit, the layout becomes easier. Still further, it is.unnecessary to use a high-speed master clock 16 MHz like a huge shift register circuit in 1024 (256×4) stages, the power consumption thereof is thus advantageously decreased.

Again back to FIG. 1, next description will be made of a method of setting a switching of the spreading code. As the spreading code for multiplication, different kinds of codes might be assigned to an up link (from mobile station to base station) and a down link (from base station to mobile station) for reasons of system design. In the case of a specific contract, the spreading code might be switched in order to perform information transmission using a different code in communication in the down link rink. Therefore, the matched filter 11 is required to be able to cope with an instant switching of the spreading code.

The spreading code setting unit 6 shown in FIG. 1 can set a spreading code. The spreading code setting unit 6 can set plural kinds of spreading replica codes in order to cope with plural kinds of spreading code lengths. The spreading code setting unit 6 comprises a code register 6a holding a spreading replica code for operation, and a code load register 6b inputted thereto a control signal from the outside to load the next spreading replica code while the arithmetic unit 5 operates, wherein the code load register 6b updates contents at the leading position (predetermined position) of the code register 6a at a predetermined timing.

The CDMA controller 10 performs a main control on the matched filter 11. The CDMA controller 10 outputs an enable/disable signal (Code-enable) to the code load register 6b, while outputting a code-type (Code-type) to the code load register 6b and a multi-tap control unit 5b.

Figure 5:
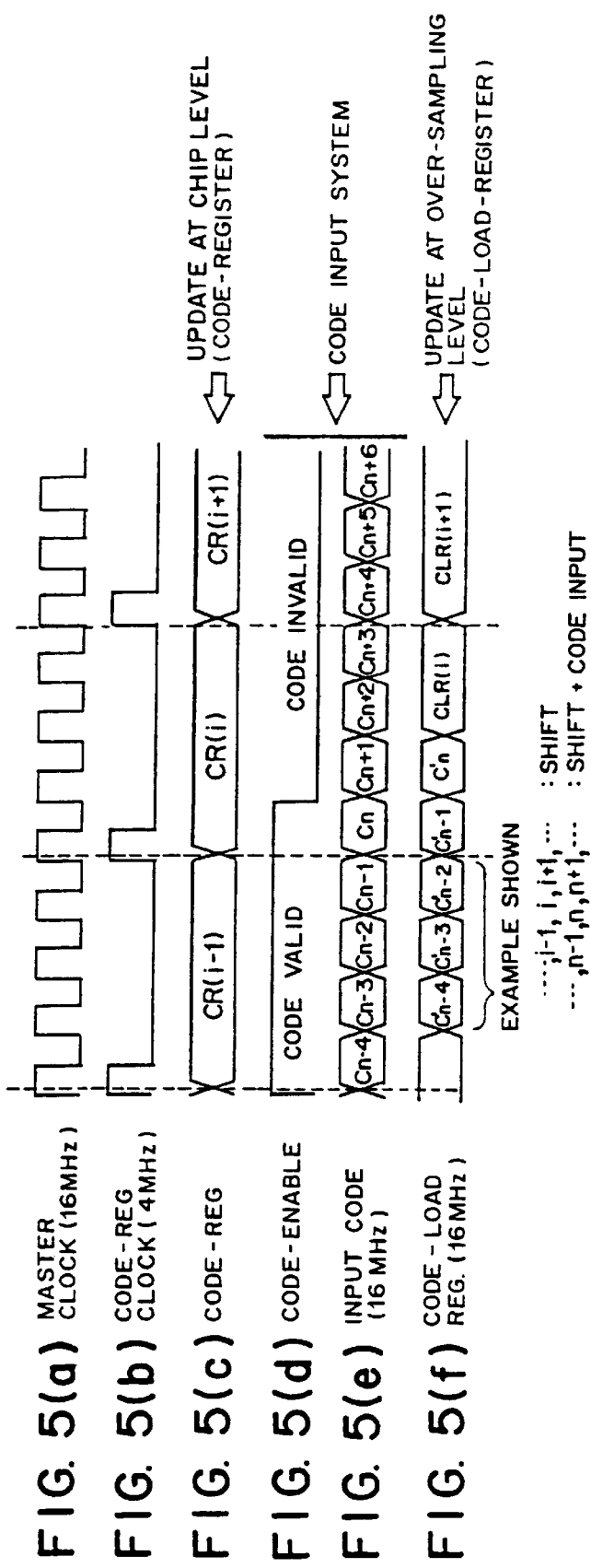
FIGS. 5(a) through 5(f) are diagrams showing a time chart of a code register and a code load register according to the embodiment of this invention.

FIGS. 5(a) through 5(f) are diagrams showing a time chart for the code register 6a and the code load register 6b according to the embodiment of this invention. FIG. 5(a) depicts a master clock (Master Clock) at 16 MHz, FIG. 5(b) depicts a clock (Code-Reg-Clock) at a chip rate of 4 MHz, FIG. 5(c) depicts data (Code-Reg) of the code register 6a, shifted at the chip rate of 4 MHz. FIG. 5(d) depicts an enable/disable signal (Code-enable) controlled by the outside CDMA controller 10 (refer to FIG. 1), where 1 (High) represents enable, whereas 0 (Low) represents disable. FIG. 5(e) depicts a spreading replica code (Input Code). FIG. 5(f) depicts data (Code-Load Reg) of the code load register 6b, shifted at an over-sampling rate (chip rate)×(the number of times of over-sampling)] in order to quickly load the spreading replica code. While the enable/disable signal (Code-enable) is 1, the spreading replica codes (Input Code) $C_{n-4}$, $C_{n-3}$, $C_{n-2}$, $C_{n-1}$ and $C_n$ are captured in the code load register 6b. When the enable/disable signal (Code-enable) is 0, the spreading replica codes $C_{n+1}$, $C_{n+2}$, $C_{n+3}$, $C_{n+4}$, $C_{n+5}$, $C_{n+6}$, . . . are not captured in the code load register 6b.

Operations of the CDMA controller 10, the code register 6a and the code load register 6b are as follows. Namely, while the other structural portions operate, the code load register 6b beforehand loads the next spreading code on the other side, and stands ready to update the code register 6a when necessary. On the other hand, the CDMA controller 10 outputs a code-type signal (Code-type) to the code load register 6b at a predetermined timing to notify of a switching to another spreading code. With the code-type signal (Code-type), a new spreading replica signal is written in the code register 6a.

As above, a switching of the spreading replica signal stored in the code register 6a for operation is instantaneously completed.

At the same time, in order to cope with a change of a used spreading code or the number of taps, the head of the code register 6a and the head of the code load register 6b should be accurately coincided. Namely, since data in the code register 6a is always shifted, the code load register 6a should stand ready to update a new code from the leading position of the code register 6a even if the code register 6a is shifted to any position.

Figure 6:
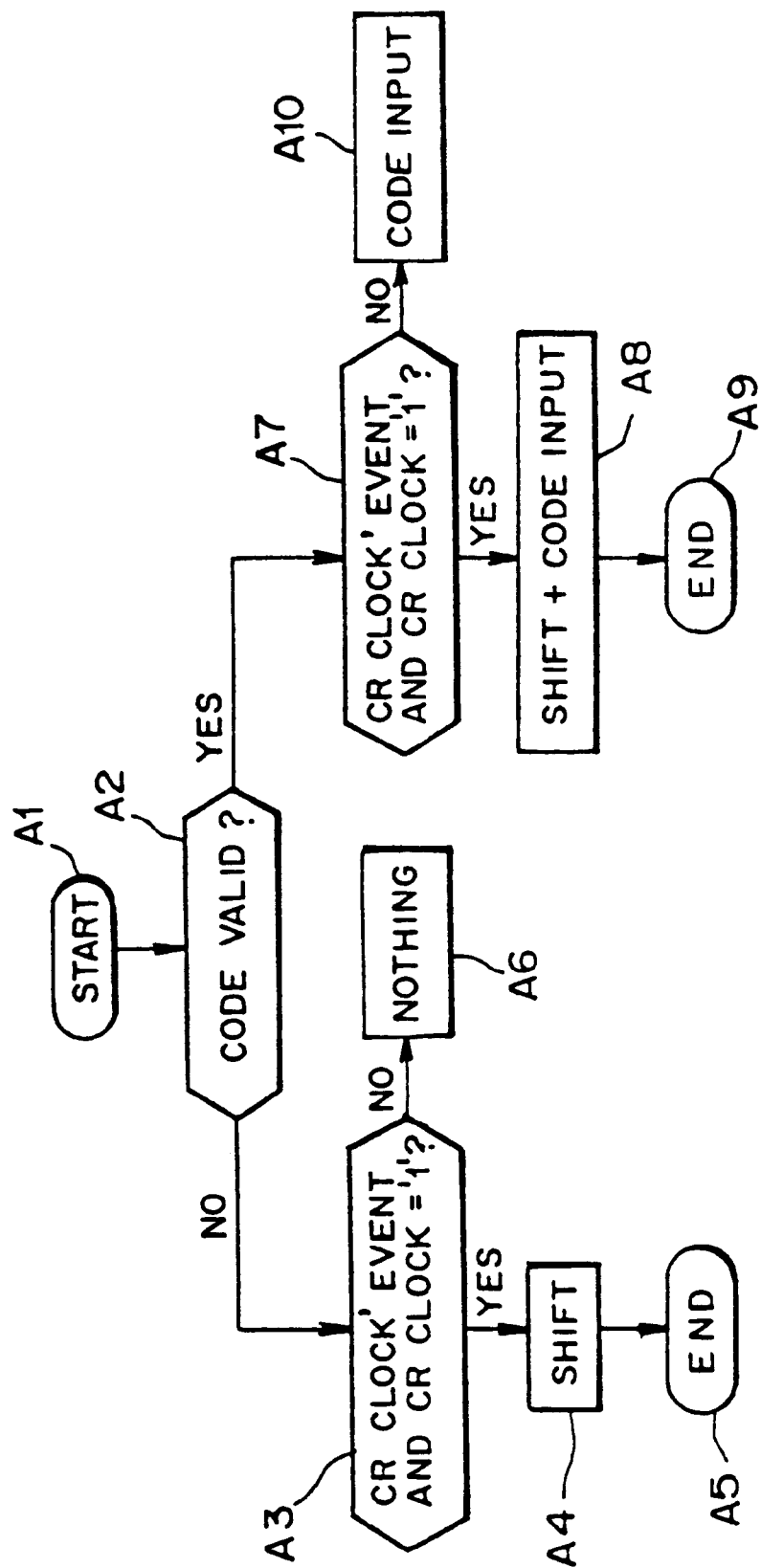
FIG. 6 is a diagram showing a control algorithm of the code load register according to the embodiment of this invention.

FIG. 6 is a diagram showing a control algorithm of the code load register according to the embodiment of this invention. The control algorithm is in the following rule. When the program is started (Step A1), the code enable/disable signal is judged at Step A2. When the code is disable, NO route is taken. When the posiedge Code-Reg-Clock is inputted at Step A3, YES route is taken, a shifting operation is performed (Step A4), and the program is terminated (Step A5). The shifting operation at this moment is performed according to the clock of 16 MHz, and the shift is for 4 clocks. When the posiedge Code-Reg-Clock is not inputted at Step A3, NO route is taken, and the CDMA controller 10 does nothing (Step A6).

When the enable/disable signal is code-enable at Step A2, YES route is taken. When the posiedge Code-Reg-Clock is inputted (Step A7), YES route is taken, the shifting operation plus a code inputting are performed (Step A8), then the program is terminated (Step A9). A reason why the shifting operation plus the code inputting are performed will be next described with reference to FIGS. 7(a) and 7(b).

Figures 7A, 7B:
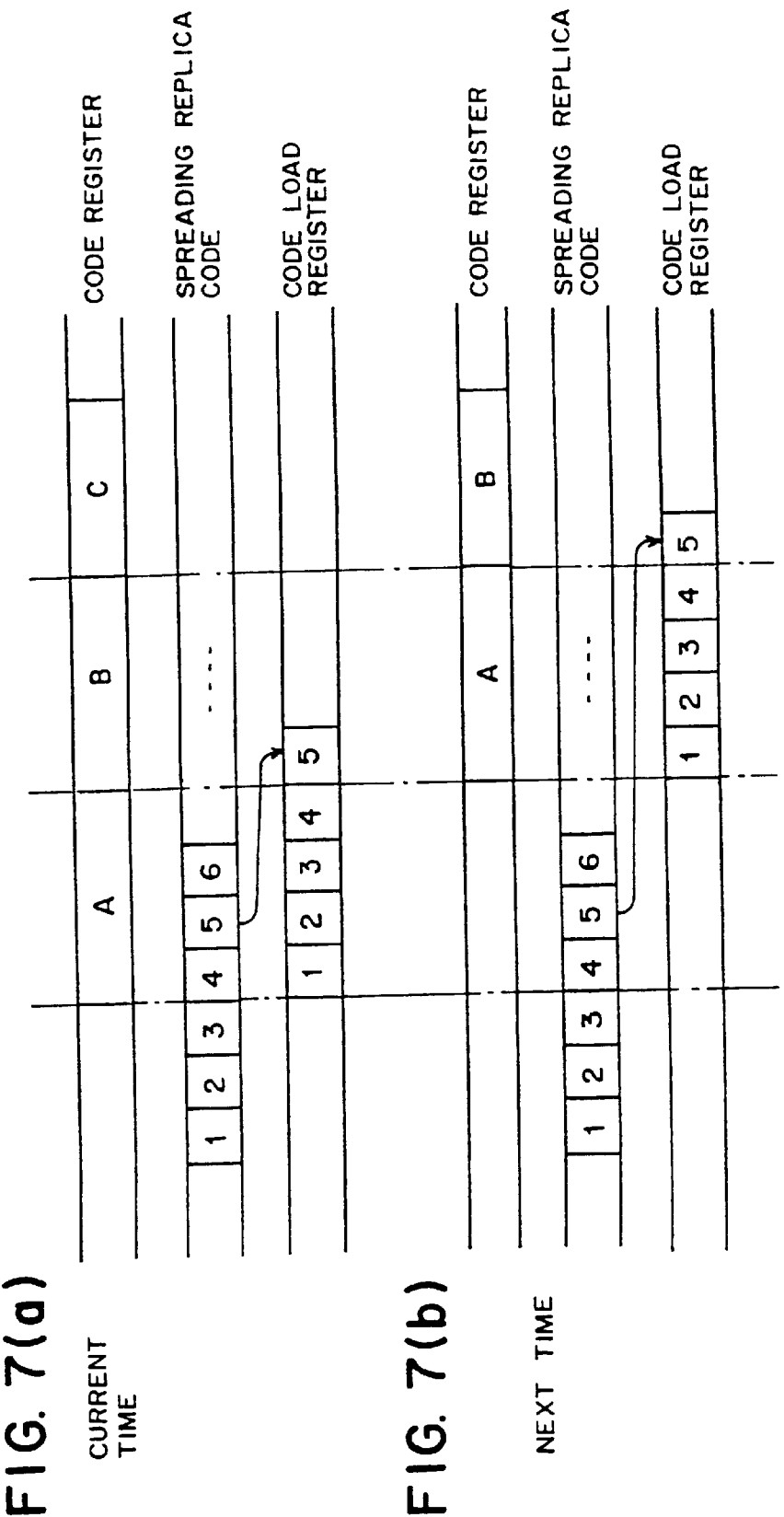
FIG. 7(a) is a diagram depicting data of the code register, a spreading replica code and data in the code load register at the current time.
FIG. 7(b) is a diagram depicting the data in the code register, the spreading replica code, and the data in the code load register at the next time.

FIG. 7(a) is a diagram depicting data in the code register 6a, a spreading replica code and data in the code load register 6b at the current time according to the embodiment of this invention. FIG. 7(b) is a diagram depicting the data in the code register 6a, the spreading replica code and the data in the code load register 6b at the next time. In FIG. 7(a), "5" of the spreading replica code is about to be loaded in the code load register 6b. As shown in FIG. 7(b), a position at which "5" is to be inputted is shifted by one from a position at the current time, since the data in the code register 6a is always shifted as well. As this, the code load register 6b is inputted thereto the enable/disable signal (Code-enable) controlled by the CDMA controller 10 to capture the next spreading code when the enable/disable signal is enable. When the enable/disable signal is disable, the code load register 6b does not capture the next spreading code. Accordingly, the code load register 6b is controlled by the algorithm updating contents at the leading position of the code register 6a in synchronism with the code register 6a. When the spread code length is changed from 256 bits to 128 bits, the code load register 6b can cope with it.

When the posiedge Code-Reg-Clock is not inputted at Step A7 shown in FIG. 6, NO route is taken, and the CDMA controller 10 performs only a code inputting (Step A10). When the code is disable, the code load register 6b functions similarly to the code register 6a.

Since the code load register 6b always operates in synchronism with the code register 6a, an instantaneous switching can be realized. Further, by lengthening or shortening a period for which the enable/disable signal is high, it is possible to adjust a length of the spreading replica code to be loaded.

Again back to FIG. 1, the arithmetic unit 5 multiplies an output from the above spread data path unit 8 by a spreading code from the spreading code setting unit 6, adds results of the multiplication, and outputs a result of the addition. The arithmetic unit 5 comprises a multiplier unit 5a and an adder unit 5c along with the multi-tap control unit 5b. The multiplier unit 5a EXORs the spread code outputted from the spread data path unit 8 and the spreading replica code outputted from the spreading code setting unit 6. The adder unit 5c adds all outputs from the multiplier unit 5a. The multi-tap control unit 5b is disposed on the output's side of the multiplier unit 5a of the arithmetic unit 5 so as to cope with plural kinds of spreading codes, to which a spread code identify signal (Code-type) that can be controlled by the CDMA controller 10 is inputted.

Accordingly, the matched filter 11, in order to be inputted thereto spread data, comprises the spread data path unit 8 comprising the sub spread data path units 2a, 2b, 2c and 2d in each of which 256 latch circuits 14 are arranged, the spread data path input control unit 9 performing a data holding control on the latch circuits 14 in a predetermined order in response to an input of the spread data, the spreading code setting unit 6 being able to set a spreading code, and the arithmetic unit 5 multiplying an output from the above spread data path unit 8 by the spreading code from the spreading code setting unit, adding results of the multiplication and outputting an added result.

Figure 8:
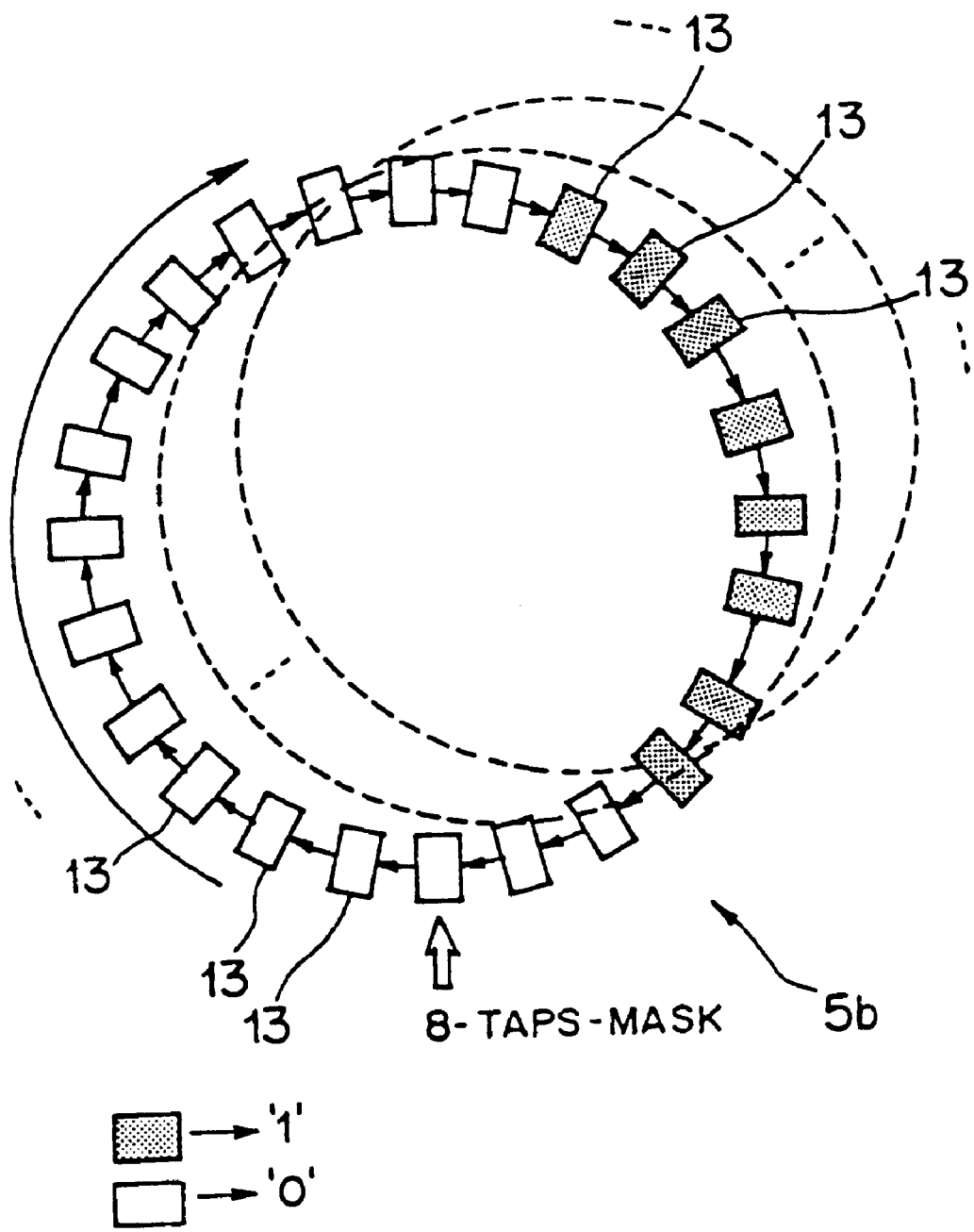
FIG. 8 is a diagram showing a structure of a multi-tap control unit according to the embodiment of this invention.

FIG. 8 is a diagram showing a structure of the multi-tap control unit 5b according to the embodiment of this invention. The multi-tap control unit 5b shown in FIG. 8 performs a control so that the matched filter 11 can be adapted to different kinds of spreading code lengths, configured with a plurality of flip-flops 15 connected in a ring. The number of the flip-flops 13 is 24, for the sake of intelligible, explanation. As shown in FIG. 8, a state of continuing 8 flip-flops among them is "1" (shaded portions in FIG. 8) representing portions outputted to the rear state without mask. A state of the other 16 flip-flops is "0", representing portions being masked and not outputted to the rear stage. The continuing positions in the state "1" shown in FIG. 8 are always dynamically changed. A manner of the operation of the multi-tap control unit 5b is as follows.

The maximum number of taps in a spread code length that is assumed to be used is M. For example, M=256 in this embodiment. As a required mask ring, a mask ring of 1 bit in M stages is created. In the mask ring, a mask according to the number of taps is created. In the case of a spread code of 128 bit length, for example, a continuous portion of "1" (portion not masked) of 128 bits and the remaining portion of "0" (portion masked) are created in 256 bits. The portion not masked is dynamically shifted at Code-Reg-Clock (16 MHz) as shown by a circle of broken line in FIG. 8 such that these mask rings are in synchronism with the code register 6a. When a spread code of a different tap number is set, a logical product of M portions of EXORed outputs and the masked portion is obtained. Namely, outputs of the spreading replica code from the multiplier unit 5a in the arithmetic unit (refer to FIG. 5) and the received spread code is EXORed. Thus obtained EXORed outputs and the masked portion are logically produced, whereby only outputs of desired taps are obtained.

As above, the spreading code setting unit 6 comprises the code register 6a holding a spreading code for operation, and the code load register 6b inputted thereto a control signal. (Code-enable) from the CDMA controller 10 to load the next spreading code while the arithmetic unit 5 operates. There is also provided the multi-tap control unit 5b on the output's side of the multiplier unit 5a of the arithmetic unit 5 in order to cope with plural kinds of spreading codes, the multi-tap controlling unit 5b comprising a mask ring having flip-flops 13 not less in number than applied taps, whereby a logical product of an output of each flip-flop 13 of the mask ring and an output of the multiplier unit 5a of the arithmetic unit 5 is outputted to the adder unit 5c of the arithmetic unit 5.

In the mask ring, continuing flip-flops equal in number to the taps among the flip-flops 13 hold the same state so that the state thereof differs from a state of the other flip-flops 13. The leading position of the mask ring is shifted in synchronism with the code register 6a, whereby data tracking is possible.

Accordingly, with one matched filter 11, it is possible to cope with different spreading code lengths, and instantaneous switching of a used spreading code can be realized. This enhances a degree of multiplication in CDMA. Even if an optional specification of the system is added, it is therefore possible to meet thereto, which increases a degree of freedom in design. Whereby, units as products can be commonly used, leading to a lower cost.

With the above structure, a received spread code downconverted and A/D converted is stored in positions designated by the round robin ring 4a and the phase counter 7 in co-operation and distributed by the first selector 1a. Next, cross-correlation between each spread code in the sub spread data path unit 2a, 2b, 2c and 2d with a spreading replica code in the code register 6a is computed.

Figure 9:
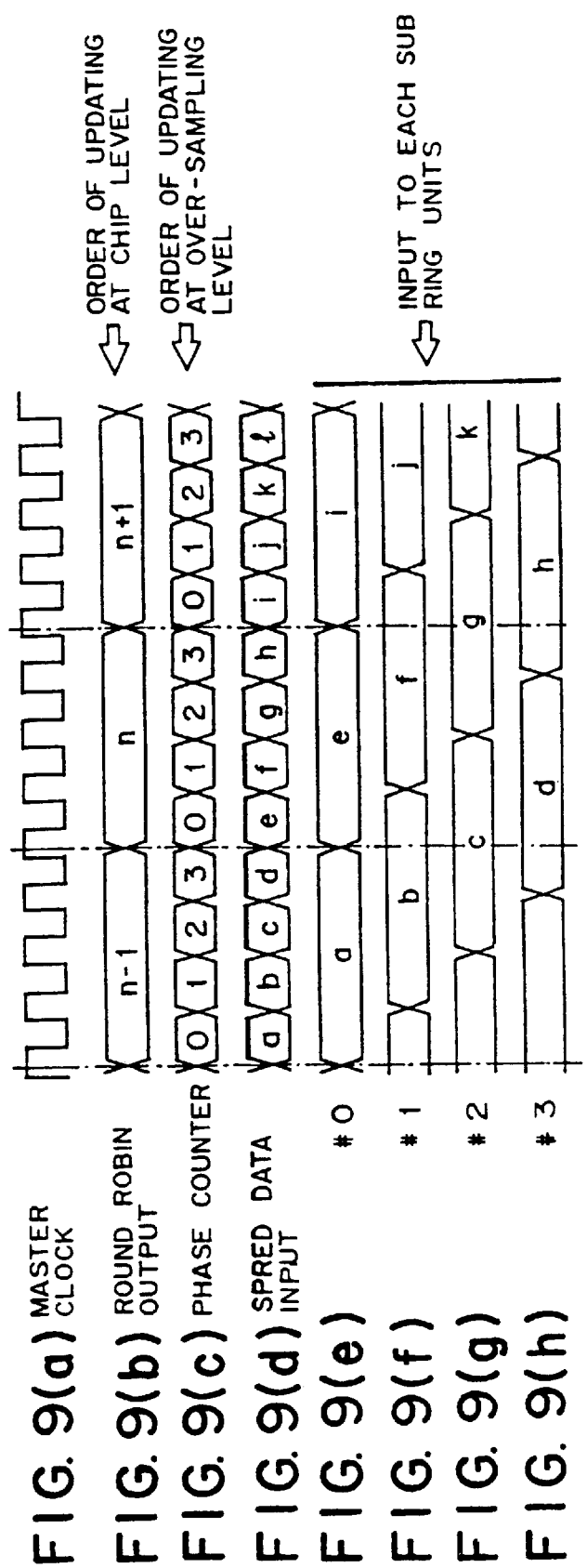
FIGS. 9(a) through 9(h) are diagrams showing a time chart of the sub spread data path units according to the embodiment of this invention.

FIGS. 9(a) through 9(h) are diagrams showing a time chart of the sub spread data path units 2a, 2b, 2c and 2d. A waveform in FIG. 9(a) is a master clock (Master Clock) at 16 MHz. By values n−1, n, n+1 (=below the number of taps T) outputted at the chip rate (4 MHz) from the round robin ring 4a shown in FIG. 9(b), positions at which a new spread code is to be updated are shown. In the order of oversampling within one chip duration outputted from the phase counter 7 shown in FIG. 9(c), inputted spread data a, b, c, d, e, f, g, h, i, j, k, 1, . . . shown in FIG. 9(d) are distributed to the sub spread data path units 2a, 2b, 2c, and 2d. Namely, the spread code a shown in FIG. 9(d) is inputted to the sub spread data path unit 2a (clock group #0) at the (n−1)th position. When a value of the phase counter becomes 1 from 0, the spread code b is inputted to the sub spread data path unit 2b (clock group #1). Similarly, when a value of the phase counter becomes 2 from 1, the spread code c is inputted to the sub spread data path unit 2c (clock group #2). When a value of the phase counter becomes 3 from 2, the spread code d is inputted to the sub spread data path unit 2d (clock group #3). In the next moment, update position information outputted from the round robin ring 4a is changed from n−1 to n at the same time that the value of the phase counter returns to 0, the spread code e is inputted to the sub spread data path unit 2a (clock group #0) at the n-th position, and the above process is repeated.

The code load register 6b in the spreading code setting unit 6 constantly monitors an enable/disable signal (Code-enable) from the CDMA controller 10 to track the lead of positions to be updated when the spreading replica code is changed. When a spreading code identify signal (Code-type) is inputted in this state, the code load register 6b sets a different kind of spreading replica code in the code register 6a, the multi-tap control unit 5b masks a portion of a predetermined desired length in the mask ring for outputs from the multiplier unit 5a, thereby obtaining outputs of a desired number of taps.

By preparing not a huge shift register but a shift register of a length equal in number to the taps, positions of a received spread code can be identified with the round robin ring 4a and signals of the phase counter 7. It is thereby advantageously possible to scale-down the circuit. Further, a scale of the circuit can be further decreased since a received spread code is stored in the latch circuits 14. It is thereby possible to largely improve the switching activity, leading to a large decrease of the power consumption of the circuit.

Further, since use of different kinds of spreading codes is possible, the parts in the radio terminal can be commonly used. Even if an optional specification is added in the system employing DS-CDMA, it is possible to meet thereto, which leads to improvement of the service to the users.

Meanwhile, results as described below have been obtained with respect to effects of the switching activity in the above structure. Conditions here are that the number of spread data path bits is 6, the number of times of oversampling is 4, the number of taps is 256, and a chip rate 4 MHz (over-sampling speed is 16 MHz) and QPSK in the primary modulation are employed.

A power consumption of a CMOS circuit in operation relies on a switching power $P_s$ given by the following formula (2):

$$P_s = A \times V_d^2 \times F \times B \times S \quad (2)$$

where A is a predetermined constant, $V_d$ is a supply voltage, F is an operating frequency, B is the number of used basic cells, and S is a switching activity. It has become clear from logic synthesis that there is little difference in circuit size, thus only estimation of the switching activity is made here.

In existing design, the number of flip-flops in operation $S_o$ (switching activity) is given by the formula (3):

$$S_o = \text{(the number of spread data path bits)} \times \text{(the number of taps)} \times \text{(the number of times of over-sampling)} \times \text{(the number of spread data paths)} \quad (3)$$

From the above values, $$S_o = 6 \times 256 \times 4 \times 2 = 12288.$$

When the matched filter 11 to which this invention is applied is used, the number of flip-flops in operation (switching activity) $S_n$ is given by the formula (4):

$$S_n = [\text{(the number of spread data path bits)} + \text{(code relating registers)} + \text{(mask)}] \times \text{(the number of spread data path)} \quad (4)$$

Where the code relating registers are the code register 6a and the code load register 6a, and the switching activities thereof are 256 and 256. Since the multi-tap in this embodiment is 5, the switching activity of the mask is 256×5. Namely, $$S_n = (6 + 256 \times 2 + 256 \times 5) \times 2 = 3596$$

From the obtained result that $S_o = 12288$ becomes $S_n = 3596$, it is seen that the switching activity of the whole circuit is effectively improved. From this, the power consumption is also improved, and this invention is very effective to a design severely required a power consumption such as a mobile device.

Use of the latch circuit 14 in a smaller circuit scale enables smaller sub spread data path units 2a, 2b, 2c and 2d. From a viewpoint of layout, wiring becomes more simple and excessive concentration of the circuit can be avoided, which leads to an easier circuit designing. A high-speed clock at 16 MHz is not used since a huge spread data path circuit is not used but a low-speed clock at 4 MHz is used, so that frequencies of the circuit operation can be reduced. Further, the switching activity and the circuit scale of the entire matched filter circuit 11 are effectively decreased.

(B) Others

The present invention is not limited to the above examples, but can be modified in various ways without departing from the scope of the invention. For example, the theory of the flip-flop may be inverted, or a specific finite-state may be expressed with plural bits or performed by another storage element. In lieu of a state generator of a one-hot type, a circuit generating another state signal may be used to form the-phase counter 7. Further, the number of spread data path bits may be changed from 6 to 8, or the number of taps may be changed to a value other than 128 or 256, or the number of times of over-sampling may be a larger value. The above modifications do not at all harm superiority of this invention.

The spread data path unit maybe formed by only dividing it into sub spread data path units without the function being able to variably set the spread code length.

Figure 10:
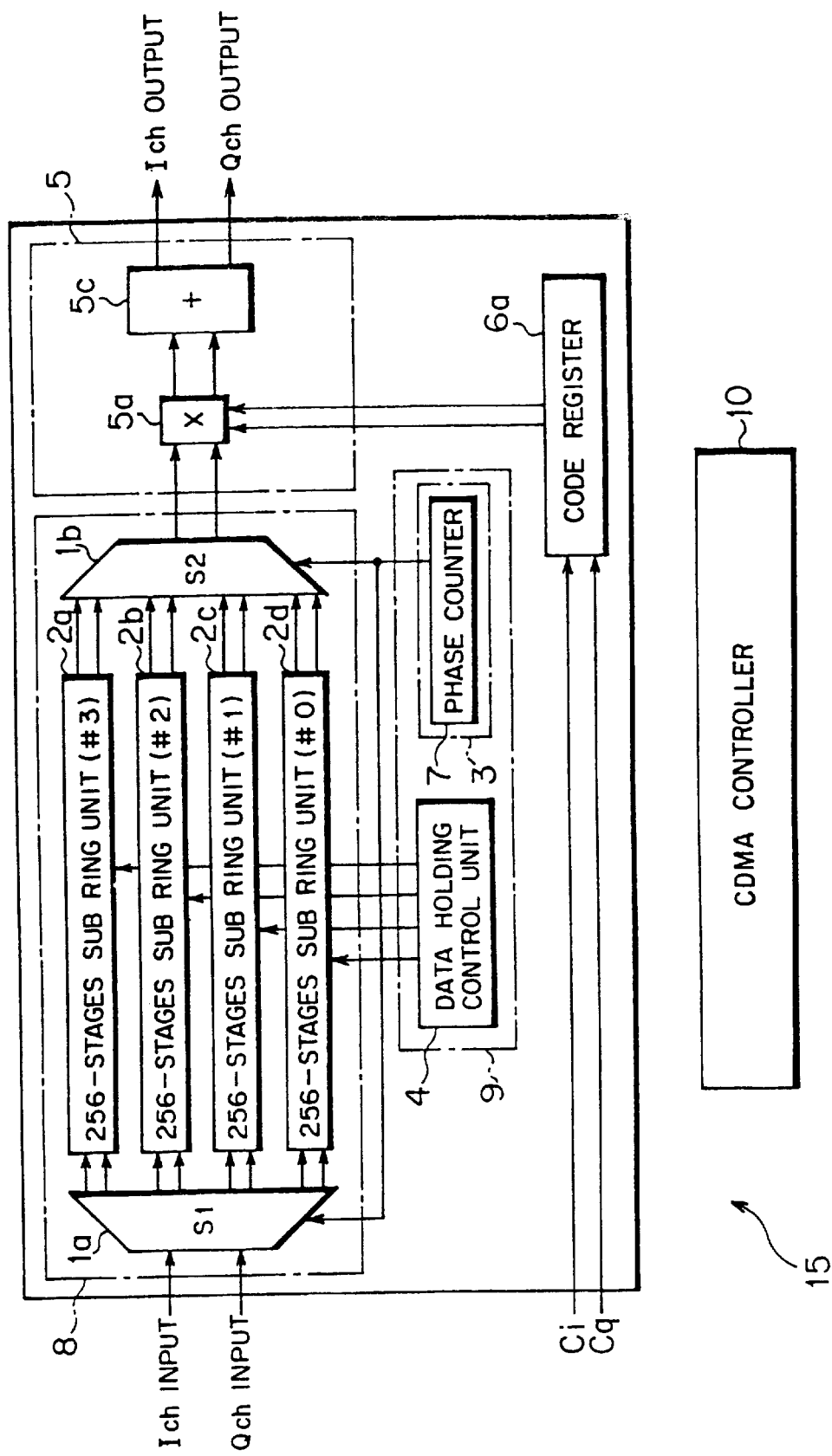
FIG. 10 is a block diagram of another matched filter to which this invention is applied.
Figure 11:
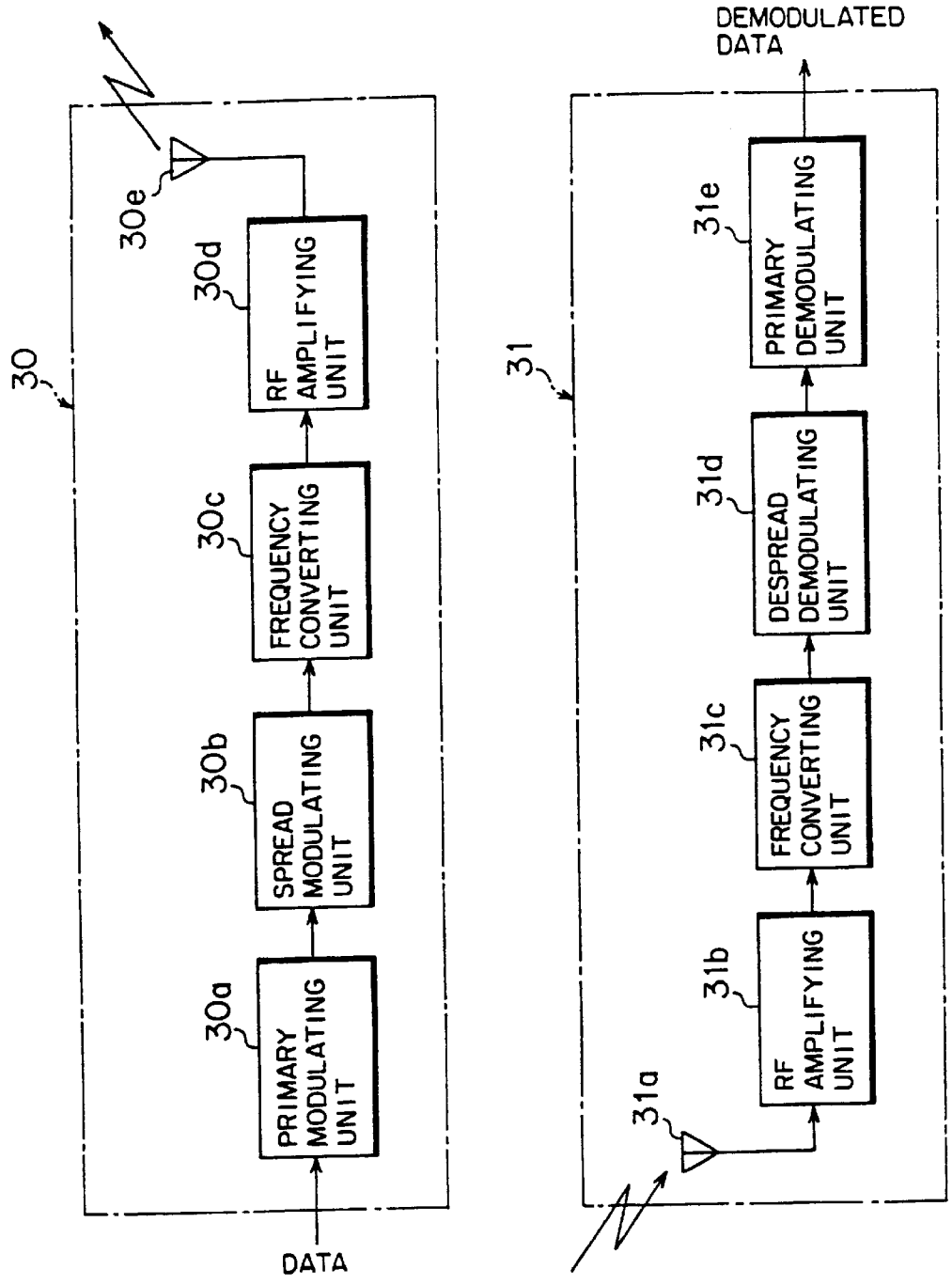
FIG. 11(a) is a block diagram of a transmitting unit of a radio terminal in DS-CDMA using QPSK.
FIG. 11(b) is a block diagram of a receiving unit of a radio terminal in DS-CDMA using QPSK.
Figure 12:
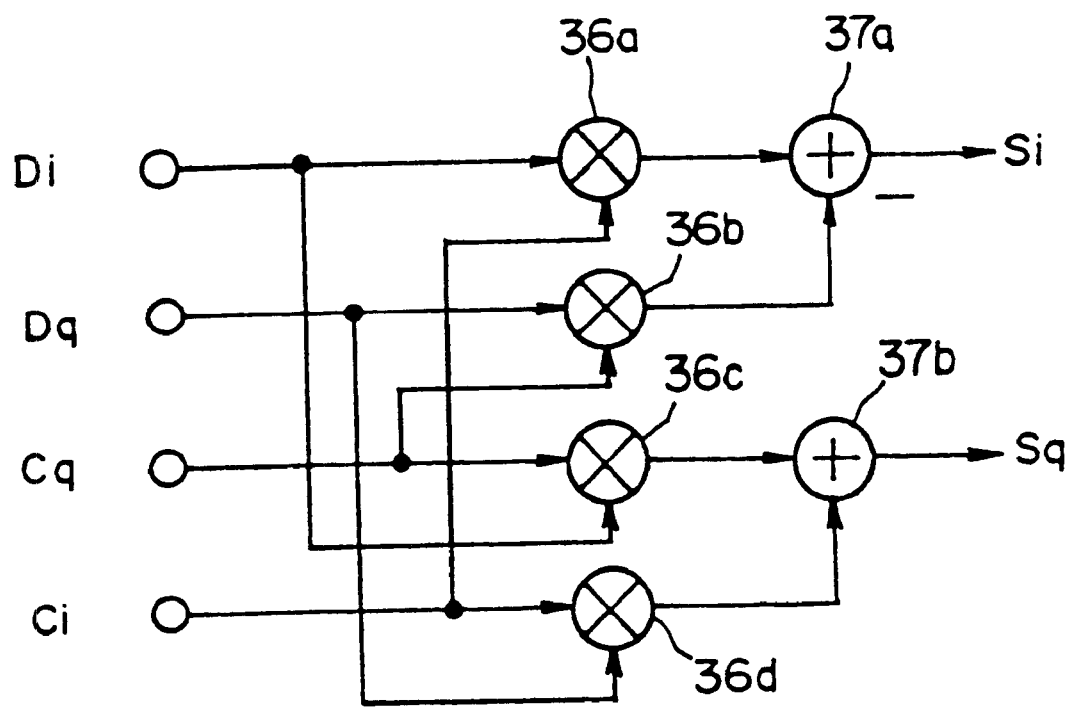
FIG. 12 is a diagram showing a relationship among a data code, a spreading code and a transmit code when the data is spread using QPSK in the primary modulation.
Figure 13:
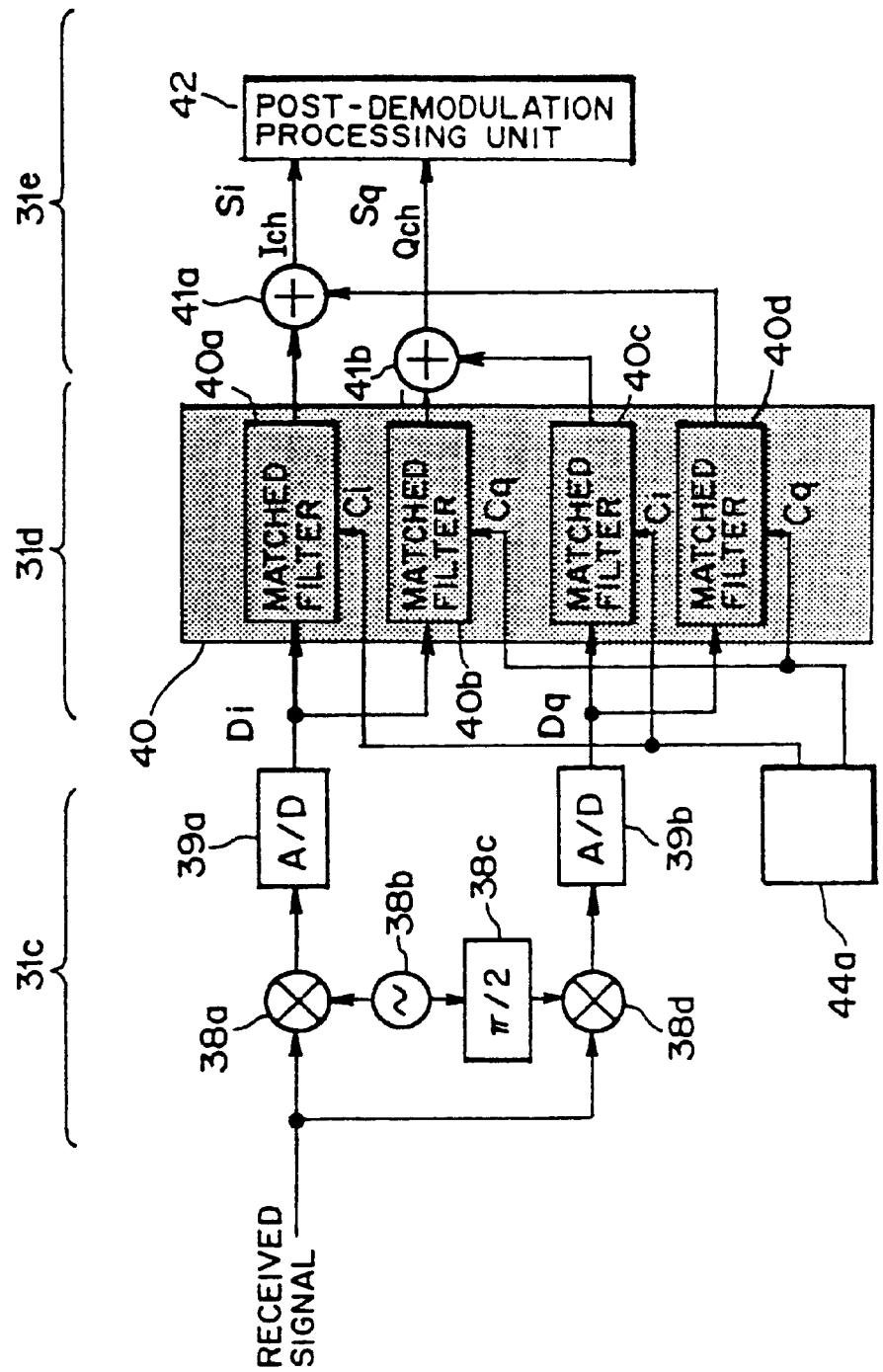
FIG. 13 is a diagram showing a detailed structure of the receiving unit of the radio terminal in DS-CDMA using QPSK.
Figure 14:
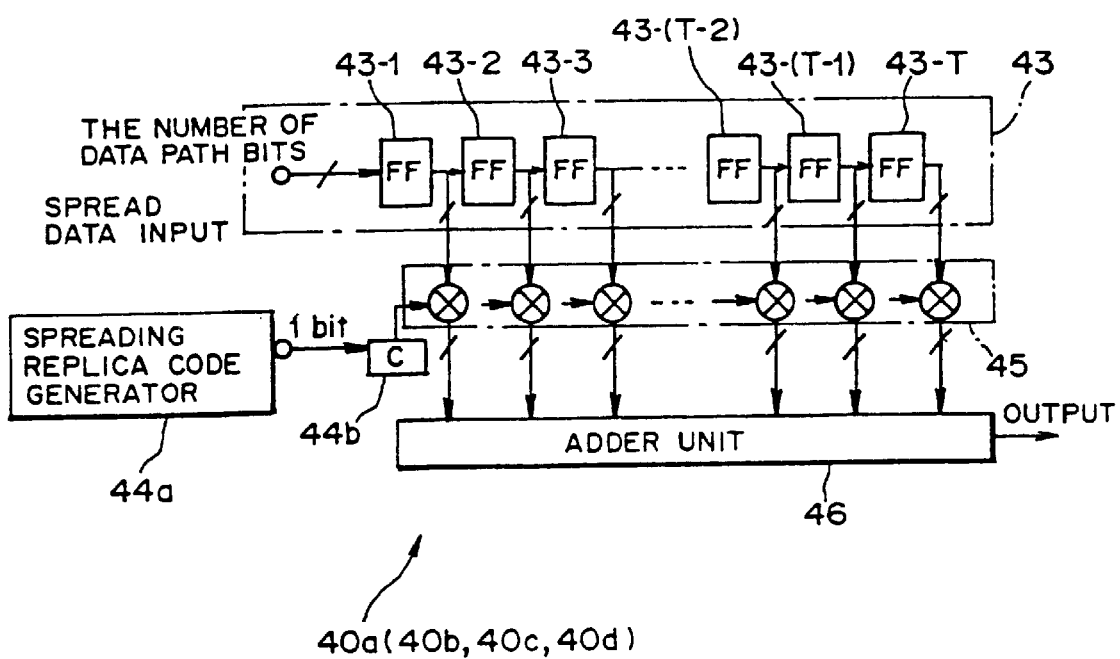
FIG. 14 is a block diagram showing a block structure of a matched filter.
Figure 15:
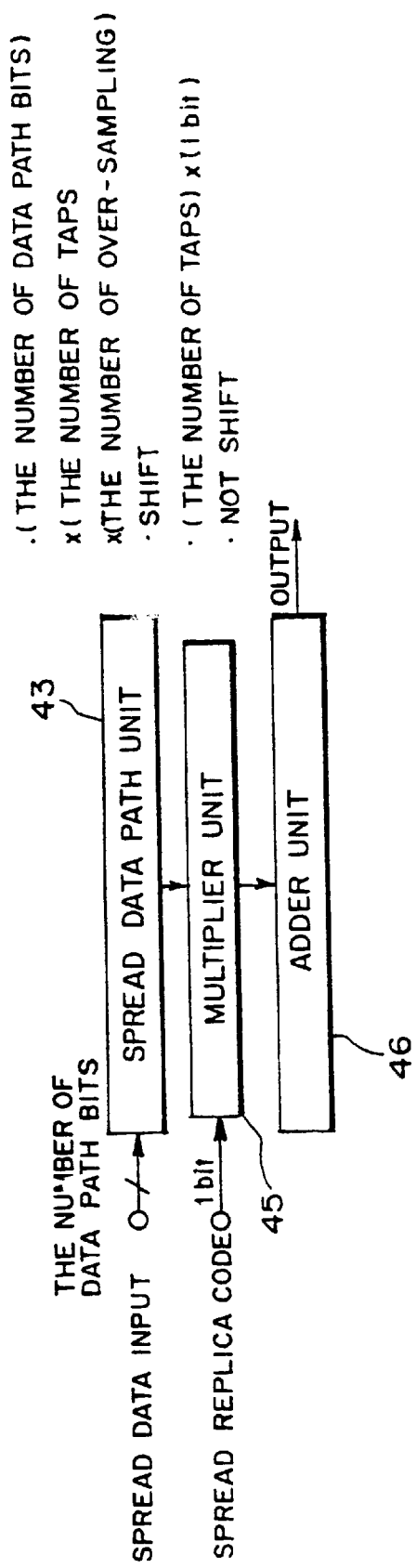
FIG. 15 is a functional block diagram of the matched filter.
Figure 16A:
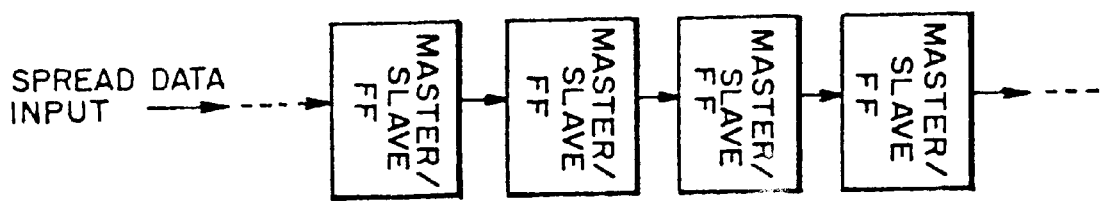
FIG. 16(a) is a diagram showing a structure of a shift register in which flip-flops of a master/slave type are used.
Figure 16B:
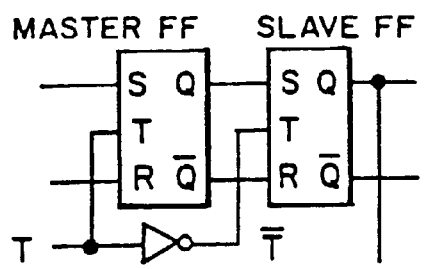
FIG. 16(b) is a diagram showing an example of the structure of the flip-flop of a master/slave type in two stages.
Figure 16C:
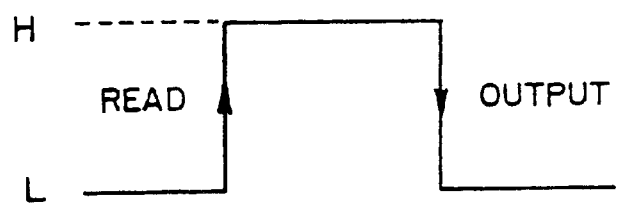
FIG. 16(c) is a diagram for illustrating an operation of the flip-flop of a master/slave type in two stages.
Figure 17:
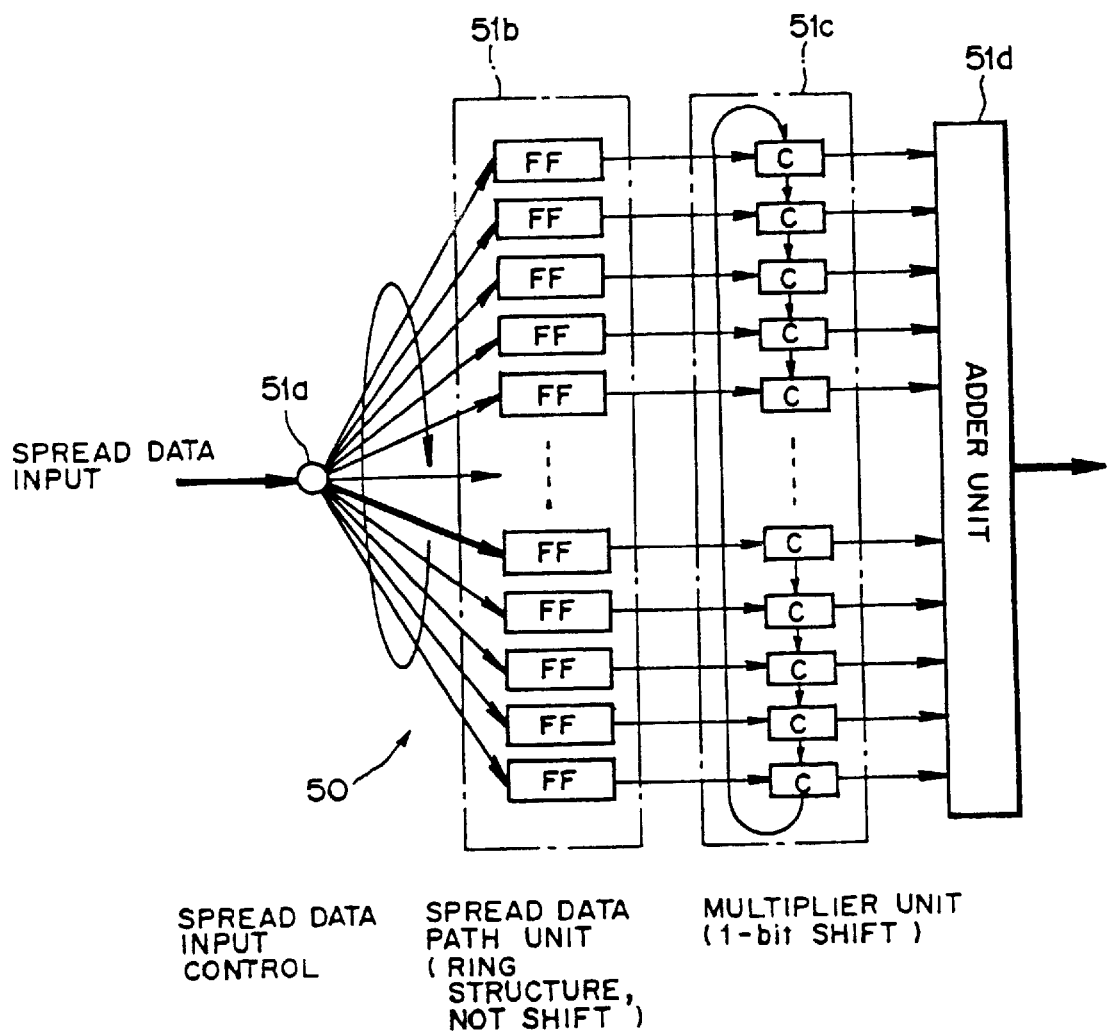
FIG. 17 is a schematic block diagram of a matched filter.
Figure 18:
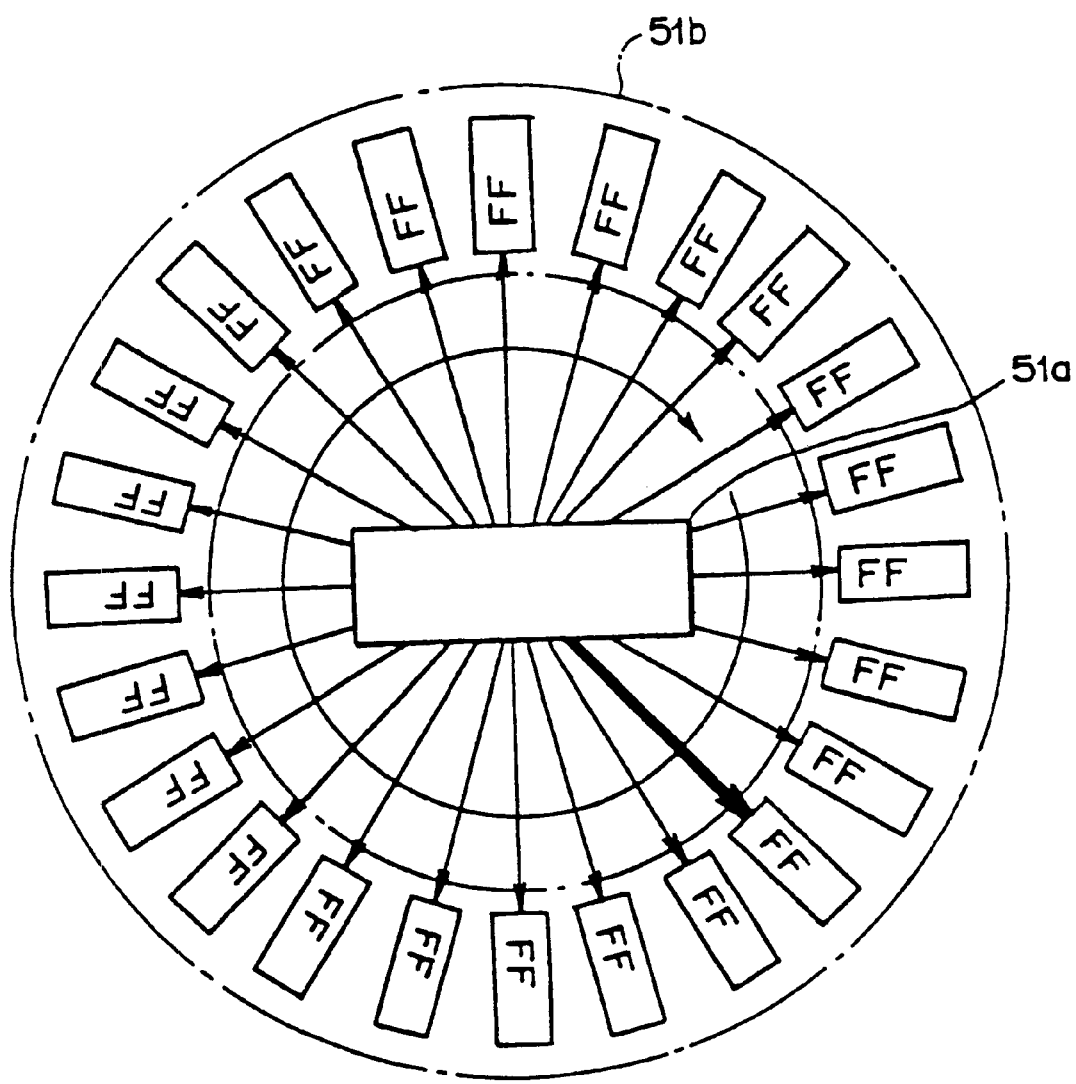
FIG. 18 is a diagram conceptually showing circuit structures of a spread data input control unit and a spread data path unit.
Figure 19:
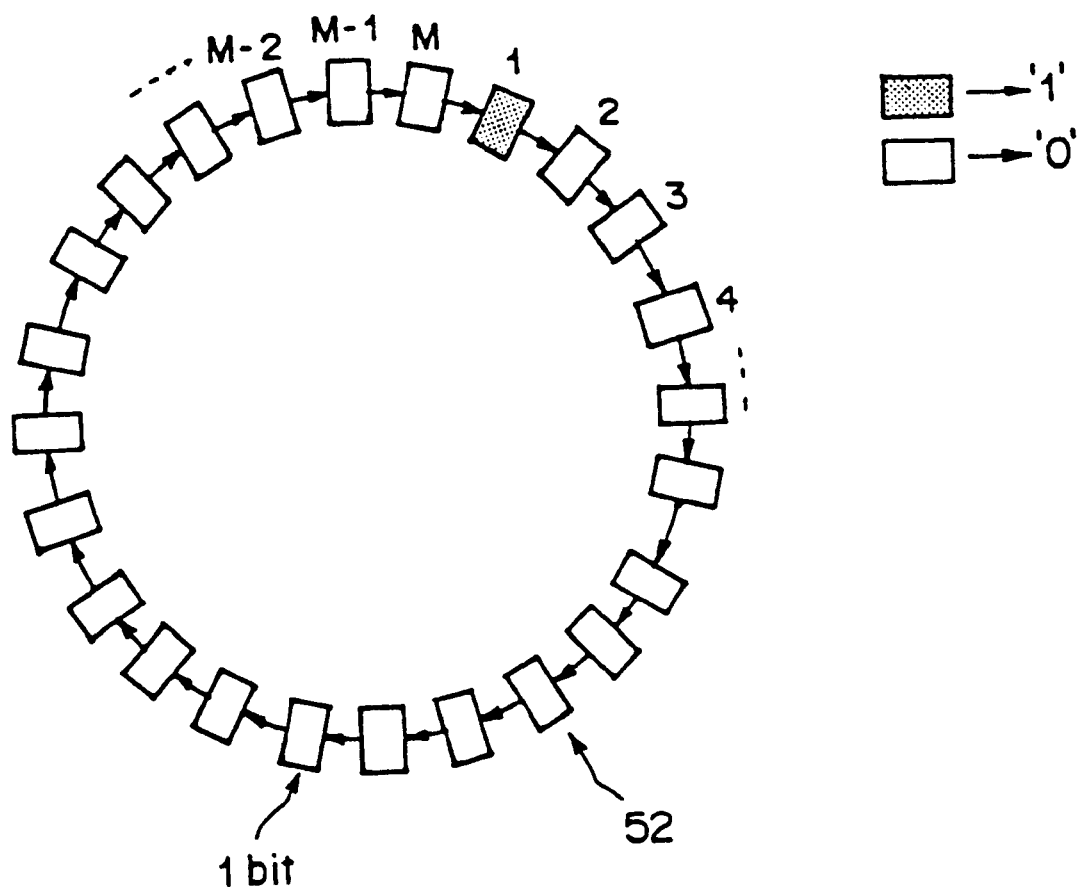
FIG. 19 is a diagram showing a structure of the spread data input control unit.

FIG. 10 is a block diagram of another matched filter to which this invention is applied. The matched filter 15 shown in FIG. 10 comprises a CDMA controller 10, a spread data path unit 8, a spread data path input control unit 9 and an arithmetic unit 5. In this case, only a spread code of a fixed length can be used. Here, units designated by the same reference characters have the same or equivalent functions, further descriptions of which are thus omitted.

With the above structure, it is possible to reduce the power consumption like the above case. It is also possible to enhance a low cost of a product of the mobile device.

What is claimed is:

1. A matched filter comprising:

a spread data path unit comprising a first selector being able to selectively output spread data, a plurality of sub spread data path units each comprising a plurality of latch circuits temporarily holding the spread data from said first selector, and a second selector being able to selectively output outputs from said sub spread data path units;

a spread data path input control unit comprising a selector control unit for performing a selection control on said first selector and said second selector according to an input of the spread data, and a data holding control unit for performing a data holding control on said sub spread data path units;

a spreading code setting unit being able to set a spreading code; and an arithmetic unit for multiplying an output from said spread data path unit by the spreading code from said spreading code setting unit, adding results of the multiplication and outputting a result of the addition.

2. The matched filter according to claim 1, wherein said spread data path unit comprises said sub spread data path units equal in number to the number of times of over-sampling; and each of said sub spread data path units is configured with latch circuits equal in number to taps.

3. The matched filter according to claim 1, wherein said data holding control unit comprises a round robin ring in which finite-state holding units equal in number to the taps are arranged in a ring; and states of said finite-state holding units equal in number to said taps are successively changed at a chip rate such that a state of only one finite-state holding unit among said finite-state holding units equal in number to said taps differs from a state of the other finite-state holding units, so that data writing to said latch circuits configuring each of said sub spread data path units is updated in a predetermined order.

4. The matched filter according to claim 1, wherein said selector control unit comprises a phase counter for generating plural different kinds of phase state signals within one chip duration and cyclically outputting one phase state signal of said different kinds of phase state signals; and said first selector cyclically gives inputted spread data to said sub spread data path units in synchronism with said different kinds of phase state signals from said phase counter, whereas said second selector selects one output among outputs of said sub spread data path units and outputs the selected output in synchronism with a corresponding one of said different kinds of phase state signals from said phase counter.

5. The matched filter according to claim 4, wherein said different kinds of phase state signals correspond to phase states equal in number to the number of times of each over-sampling.

6. The matched filter according to claim 1, wherein said spreading code setting unit can set plural kinds of spreading codes in order to cope with plural kinds of spread code lengths.

7. The matched filter according to claim 6, wherein said spreading code setting unit comprises a code register for holding the spreading code for operation and a code load register being inputted thereto a control signal from the outside to load the next spreading code while said arithmetic unit operates; and said code load register updates contents at a predetermined position of said code register at a predetermined timing.

8. The matched filter according to claim 7, wherein said code load register is inputted thereto an enable/disable signal controlled from the outside to capture the next spreading code when said enable/disable signal ifs enable, while not capturing when said enable/disable signal is disable, and is controlled by an algorithm updating contents at the leading position of said code register in synchronism with said code register.

9. The matched filter according to claim 6, wherein said spreading code setting unit comprises a code register for holding the spreading code for operation and a code load register being inputted thereto a control signal from the outside to load the next spreading code while said arithmetic unit operates;

a multi-tap control unit is disposed on the multiplied output's side of said arithmetic unit in order to cope with plural kinds of spreading codes;

said multi-tap control unit comprises a mask ring comprising finite-state holding units not less in number than applied taps; and a logical product of an output of each of said finite-state holding units of said mask ring and a multiplied output of said arithmetic unit is outputted to an adder unit of said arithmetic unit.

10. The matched filter according to claim 9, wherein, in said mask ring, continuing finite-state holding units equal in number to the taps among said finite-state holding units hold the same state so that a state thereof differs from a state of the other finite-state holding units; and the leading position in said mask ring is shifted in synchronism with said code register.

11. The matched filter according to claim 9, wherein said multi-tap control unit is inputted thereto a spread code identify signal that can be controlled from the outside.

12. A matched filter comprising:

a spread data path unit comprising a plurality of sub spread data path units in each of which a plurality of latch circuits are arranged in order that spread data is inputted thereto;

a spread data path input control unit for performing a data writing control to said latch circuits in a predetermined order according to an input of the spread data;

a spreading code setting unit being able to set a spreading code; and an arithmetic unit for multiplying an output from said spread data path unit by the spreading code from said spreading code setting unit, adding results of the multiplication and outputting a result of the addition.

* * * * *